United States Patent
Elmalem et al.

(10) Patent No.: US 10,002,275 B2
(45) Date of Patent: Jun. 19, 2018

(54) OPTICAL ELEMENT HAVING TWO PHASE MASKS

(71) Applicant: Ramot at Tel-Aviv University Ltd., Tel-Aviv (IL)

(72) Inventors: Shay Elmalem, Moreshet (IL); Emanuel Marom, Tel-Aviv (IL); Harel Haim, Tel-Aviv (IL); Naim Konforti, Holon (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days. days.

(21) Appl. No.: 14/903,287

(22) PCT Filed: Jul. 8, 2014

(86) PCT No.: PCT/IL2014/050611
§ 371 (c)(1),
(2) Date: Jan. 7, 2016

(87) PCT Pub. No.: WO2015/004659
PCT Pub. Date: Jan. 15, 2015

(65) Prior Publication Data
US 2016/0379030 A1 Dec. 29, 2016

Related U.S. Application Data

(60) Provisional application No. 61/843,488, filed on Jul. 8, 2013.

(51) Int. Cl.
*G06K 7/14* (2006.01)
*G02B 5/18* (2006.01)
(Continued)

(52) U.S. Cl.
CPC ......... *G06K 7/1413* (2013.01); *G02B 5/1871* (2013.01); *G02B 27/0075* (2013.01);
(Continued)

(58) Field of Classification Search
CPC . G02B 5/00; G02B 1/00; G02B 27/00; G02B 5/1871; G02B 27/0075; G06K 7/14;
(Continued)

(56) References Cited

U.S. PATENT DOCUMENTS

| 6,707,608 B1 | 3/2004 | Arieli et al. |
| 2010/0097487 A1 | 4/2010 | Marom et al. |

(Continued)

FOREIGN PATENT DOCUMENTS

| EP | 2487522 | 8/2012 |
| WO | WO 2015/004659 | 1/2015 |

OTHER PUBLICATIONS

International Preliminary Report on Patentability Dated Jan. 21, 2016 From the International Bureau of WIPO Re. Application No. PCT/IL2014/050611.

(Continued)

*Primary Examiner* — Sonji Johnson

(57) ABSTRACT

An optical element is disclosed. The optical element comprises: a first phase shift mask formed on a first optical material and constituted to generate a positive phase shift, and a second phase shift mask formed on a second optical material and constituted to generate a negative phase shift, wherein the phase shift masks are arranged serially on an optical axis, and wherein a refractive index of at least one of the first and second optical materials varies with the temperature at a rate of at least $50 \times 10^{-6}$ per degree Kelvin.

24 Claims, 27 Drawing Sheets
(22 of 27 Drawing Sheet(s) Filed in Color)

(51) Int. Cl.
G02B 27/00 (2006.01)
G02F 1/01 (2006.01)
G06K 19/06 (2006.01)
H04N 5/225 (2006.01)
H04N 5/33 (2006.01)

(52) U.S. Cl.
CPC ....... G02F 1/0147 (2013.01); G06K 19/0614 (2013.01); *G02F 2203/11* (2013.01); *H04N 5/2254* (2013.01); *H04N 5/33* (2013.01)

(58) Field of Classification Search
CPC .. G06K 19/06; G06K 7/1413; G06K 19/0614; G02F 1/0147; G02F 2203/11; H04N 5/2254; H04N 5/33
See application file for complete search history.

(56) References Cited

U.S. PATENT DOCUMENTS

2015/0301333 A1* 10/2015 Levesque ............. G02B 5/1809 250/201.9
2017/0146706 A1 5/2017 Elmalem et al.

OTHER PUBLICATIONS

International Search Report and the Written Opinion Dated Sep. 8, 2014 From the International Searching Authority Re. Application No. PCT/IL2014/050611.
Arieli et al. "Design of a Diffractive Optical Element for Wide Spectral Bandwidth", Optics Letters, 23(11): 823-824, Jun. 1, 1998.
Arieli et al. "Design of Diffractive Optical Elements for Multiple Wavelengths", Applied Optics, 37(26): 6174-6177, Sep. 10, 1998.
Ben-Eliezer et al. "An Optimal Binary Amplitude-Phase Mask for Hybrid Imaging Systems That Exhibit High Resolution and Extended Depth of Field", Optics Express, 16(25): 20540-20561, Dec. 8, 2008.
Bin et al. "Infrared Imaging System for Reduction of Defocus", Advances in Optoelectronics and Micro/Nano-Optics, AOM, 2010 OSA-IEEE-COS, p. 1-2, Dec. 3, 2010. Abstract, Section III.
Chen et al. "Wavefront Coding Technique for Controlling Thermal Defocus Aberration in an Infrared Imaging System", Optics Letters, 36(16): 3021-3023, Aug. 4, 2011. Abstract, Section 3, 4.
Dowski et al. "Extended Depth of Field Through Wave-Front Coding", Applied Optics, 34(11): 1859-1866, Apr. 10, 1995.
Ebstein "Nearly Index-Matched Optics for Aspherical, Diffractive, and Achromatic-Phase Diffractive Elements", Optics Letters, 21(18): 1454-1456, Sep. 15, 1996.
Elmalem et al. "Infrared Imagingn-Passive Thermal Compensation Via a Simple Phase Mask", Romanian Reports in Physics, 65(3): 700-710, Sep. 3, 2013.
Elmalem et al. "Polychromatic Imaging With Extended Depth of Field Using Phase Masks Exhibiting Constant Phase Over Broad Wavelength Band", Applied Optics, 52(36): 8634-8643, Dec. 11, 2013.
Ford "Active Temperature Compensation of an Infrared Zoom Lens", Proceedings of the SPIE, 3129: 138-143, Sep. 1997.
Guehne et al. "Strategy for Design of Achromatic Diffractive Optical Elements With Minimized Etch Depths", Applied Optics, 52(34): 8419-8423, Nov. 25, 2013.
Haim et al. "Performance of Imaging Systems Analyzed With Two-Dimensional Target", Applied Optics, 51(25): 5966-5972, Sep. 1, 2012.
Hawkins et al. "The Temperature-Dependent Spectral Properties of Filter Substrate Materials in the Far-Infrared (6-40 [Mu]m)", Infrared Physics & Technology, 45: 69-79, 2004.
Milgrom et al. "Pupil Coding Masks for Imaging Polychromatic Scenes With High Resolution and Extended Depth of Field", Optics Express, 18(15): 15569-15584, Jul. 8, 2010. Abstract, Section 1, 4.
Muyo et al. "Wavefront Coding for Athermalization of Infrared Imaging Systems", Electro-Optical and Infrared Systems: Technology and Applications, Proceedings of the SPIE, 5612: 227-235, Oct. 25, 2004. Abstract, Section 3.
Ojeda-Castaneda et al. "Tunable Phase Masks for Extended Depth of Field", Progress in Electromagnetics Research Symposium Proceedings, Cambridge, MA, USA, Jul. 5-8, 2010, p. 531-533, Jul. 5, 2010. Abstract, Section 3, 4.
Sung et al. "Software Lens Compensation Applied to Athermalization of Infrared Imaging Systems", Optical Review, 16(3): 313-317, 2009.
Wang et al. "High Focal Depth With a Pure-Phase Apodizer", Applied Optics, 40(31): 5658-5662, Nov. 1, 2001.
Wood et al. "Passively Athermalised Hybrid Objective for a Far Infrared Uncooled Thermal Imager", Infrared Technology and Applications XXII, Proceedings of the SPIE, 2744: 500-509, 1996.
Yang et al. "Three-Shell-Based Lens Barrel for the Effective Athermalization of an IR Optical System", Applied Optics, 50(33): 6206-6213, Nov. 20, 2011.
Supplementary European Search Report and the European Search Opinion dated Feb. 15, 2017 From the European Patent Office Re. Application No. 14822346.4. (11 Pages).
Frey et al. "Temperature-Dependent Refractive Index of Silicon and Germanium", Proceedings of the SPIE, Optomechanical Technologies for Astronomy, XP055341994, 6273: 62732J-1-62732J-10, Jun. 14, 2006.
Official Action dated Mar. 14, 2017 From the U.S. Patent and Trademark Office Re. U.S. Appl. No. 15/427,127. (14 pages).
Official Action dated Dec. 15, 2017 From the U.S. Patent and Trademark Office Re. U.S. Appl. No. 15/427,127. (18 pages).

* cited by examiner

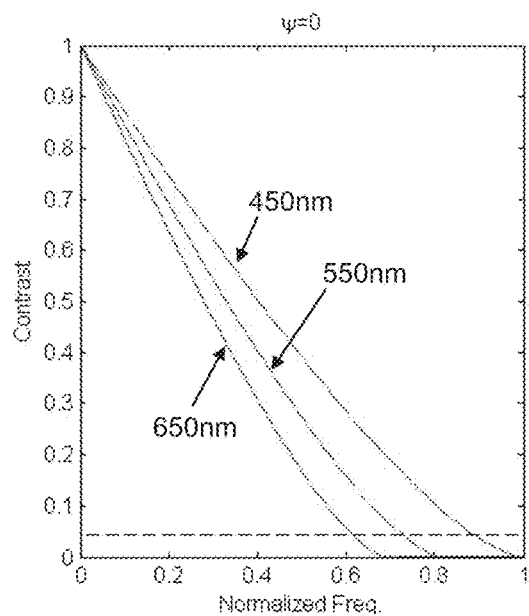
FIG. 3A
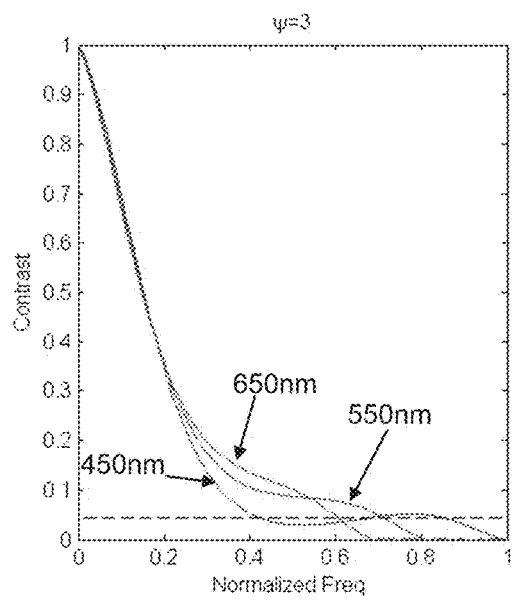
FIG. 3B
FIG. 3C
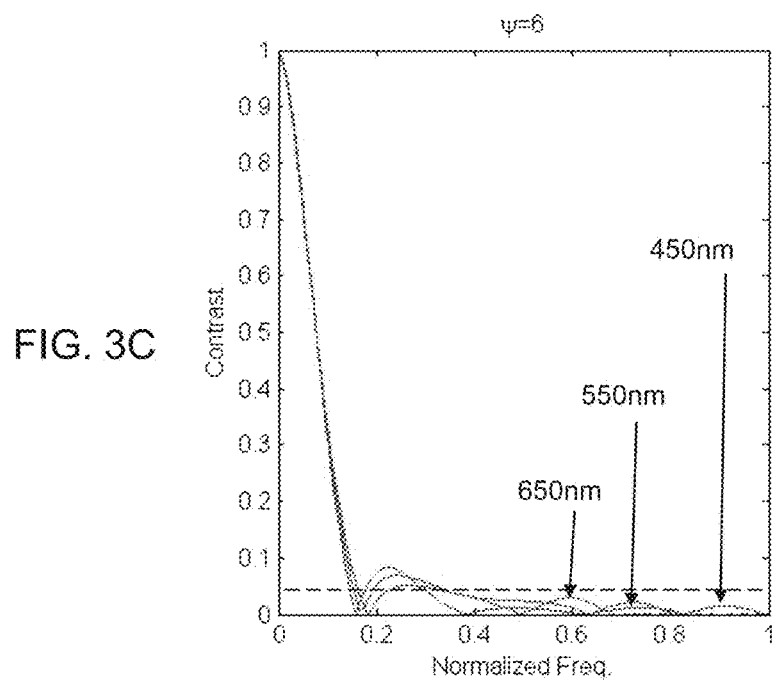

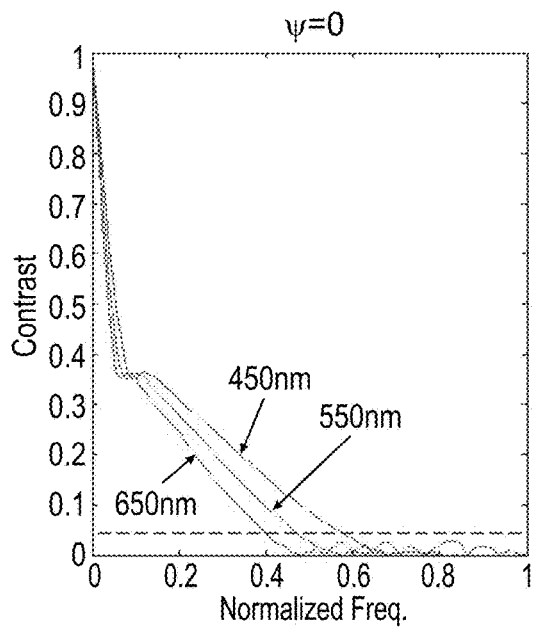
FIG. 9A
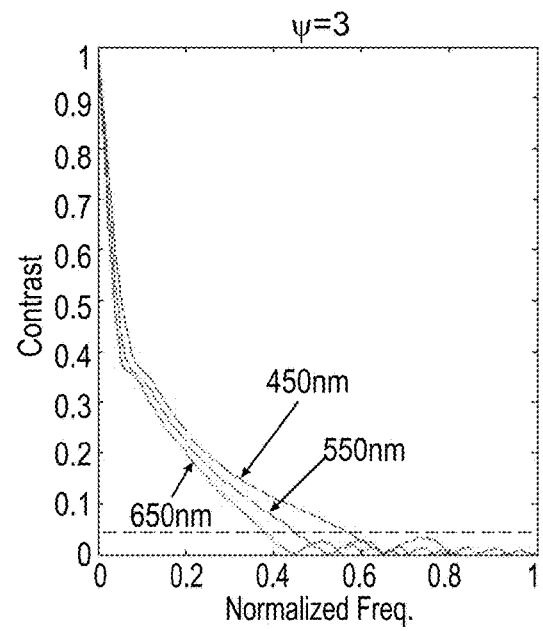
FIG. 9B
FIG. 9C
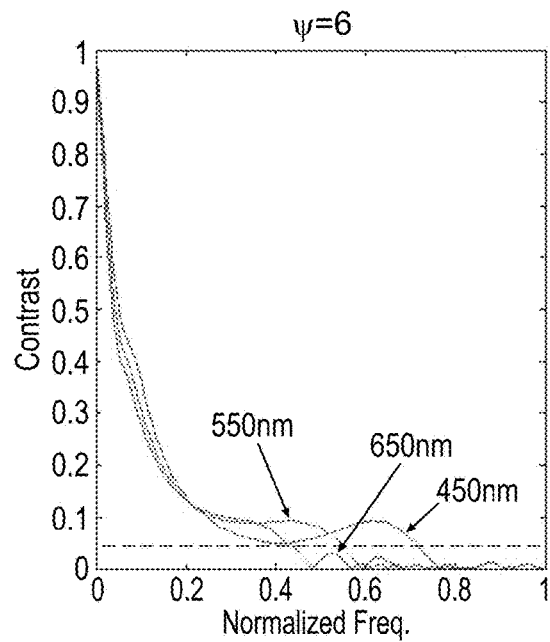

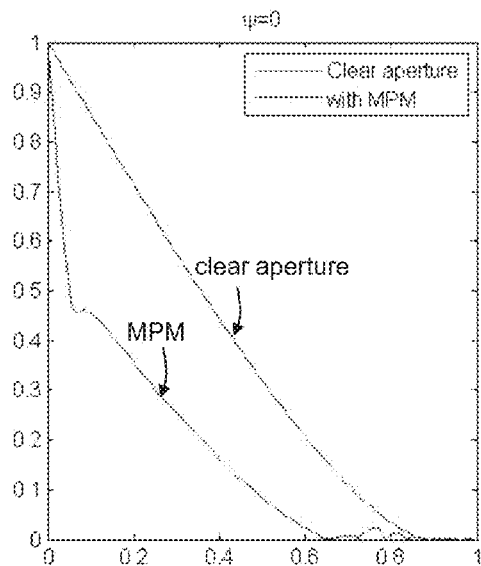
FIG. 16A
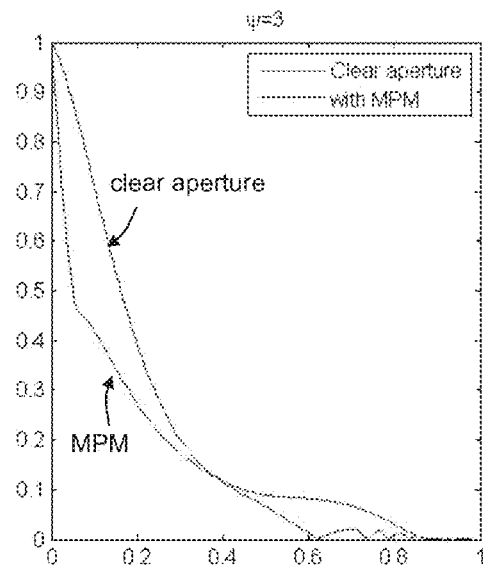
FIG. 16B
FIG. 16C
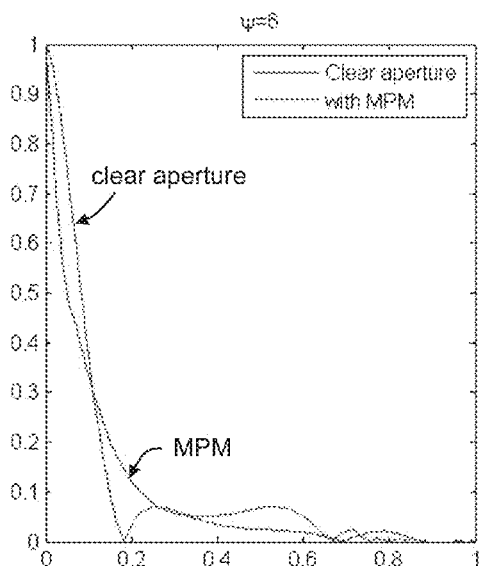

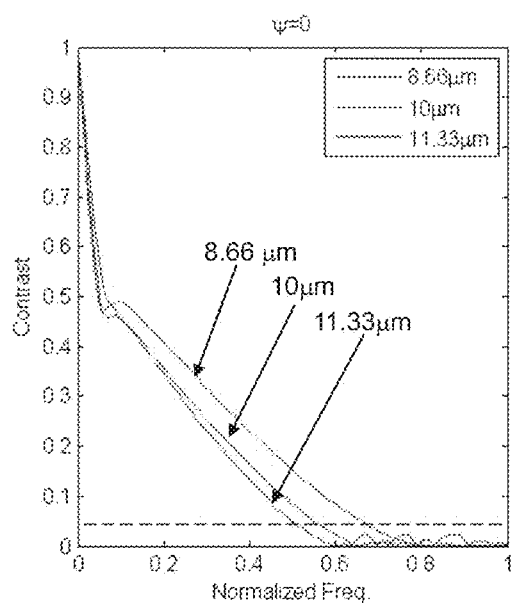
FIG. 19A
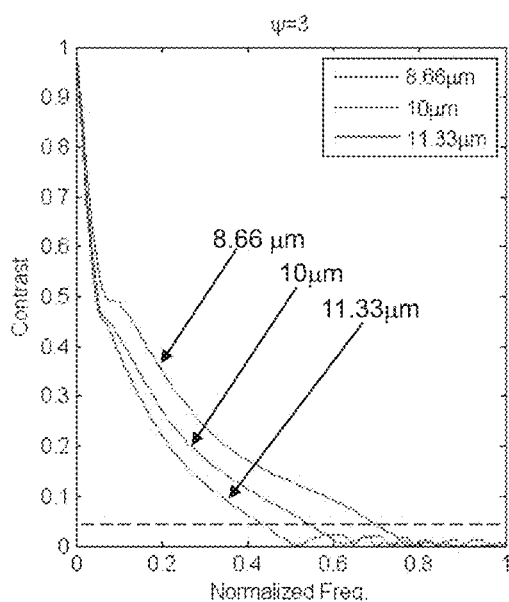
FIG. 19B
FIG. 19C
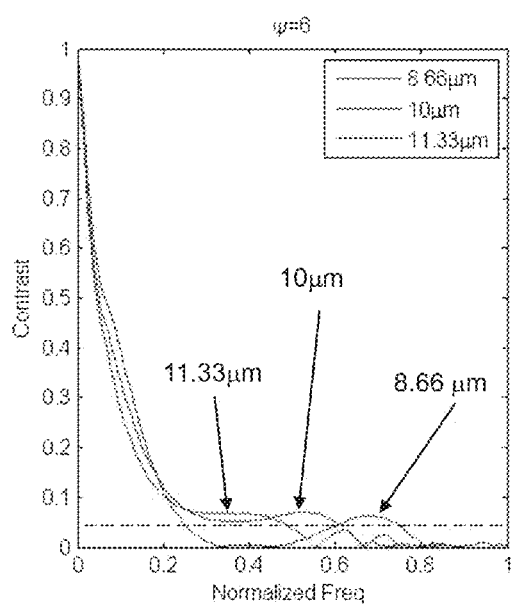

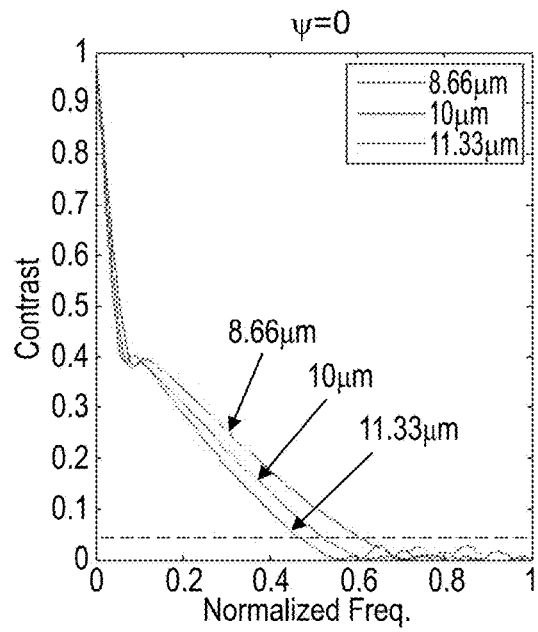
FIG. 20A
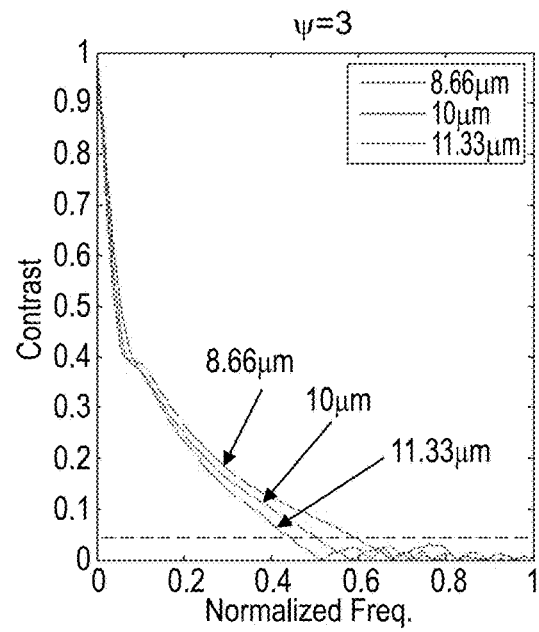
FIG. 20B
FIG. 20C
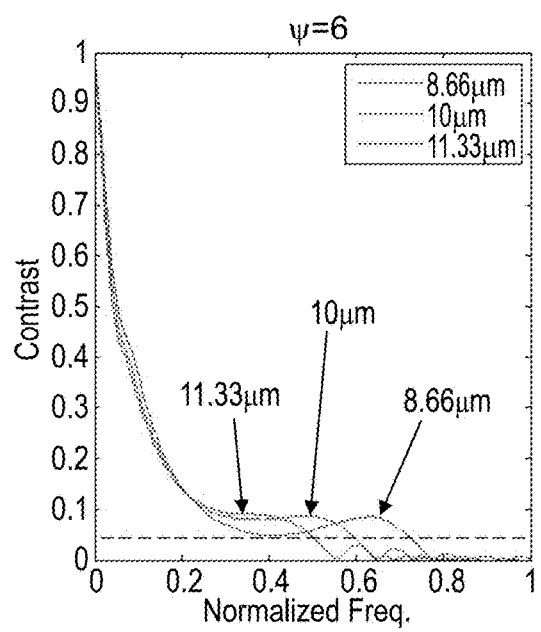

FIG. 22A
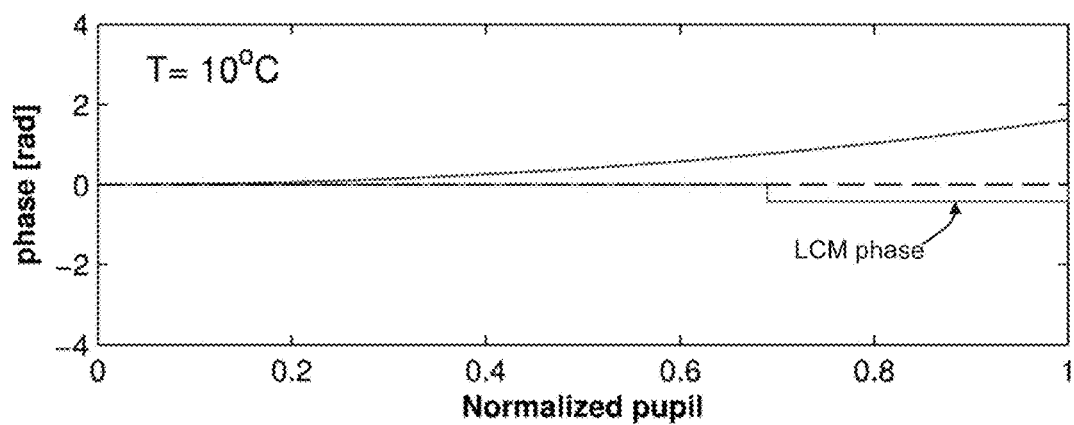
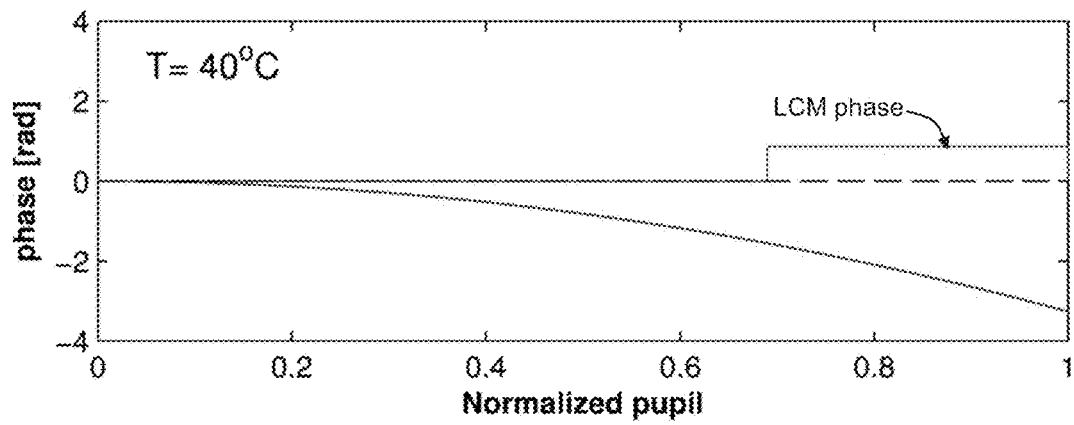
FIG. 22B

FIG. 22C
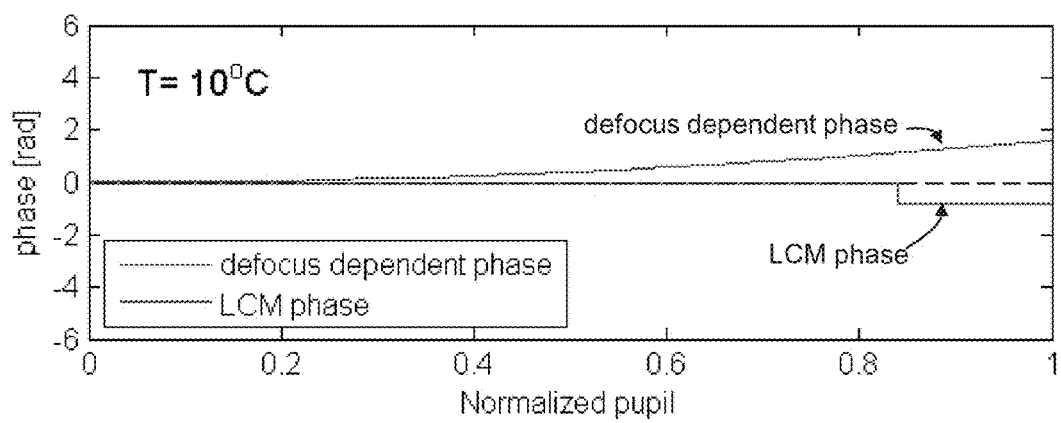
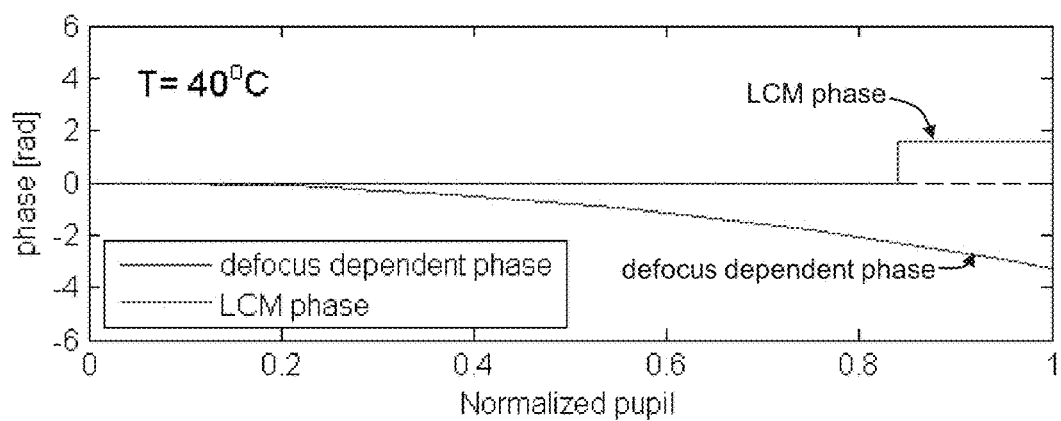
FIG. 22D

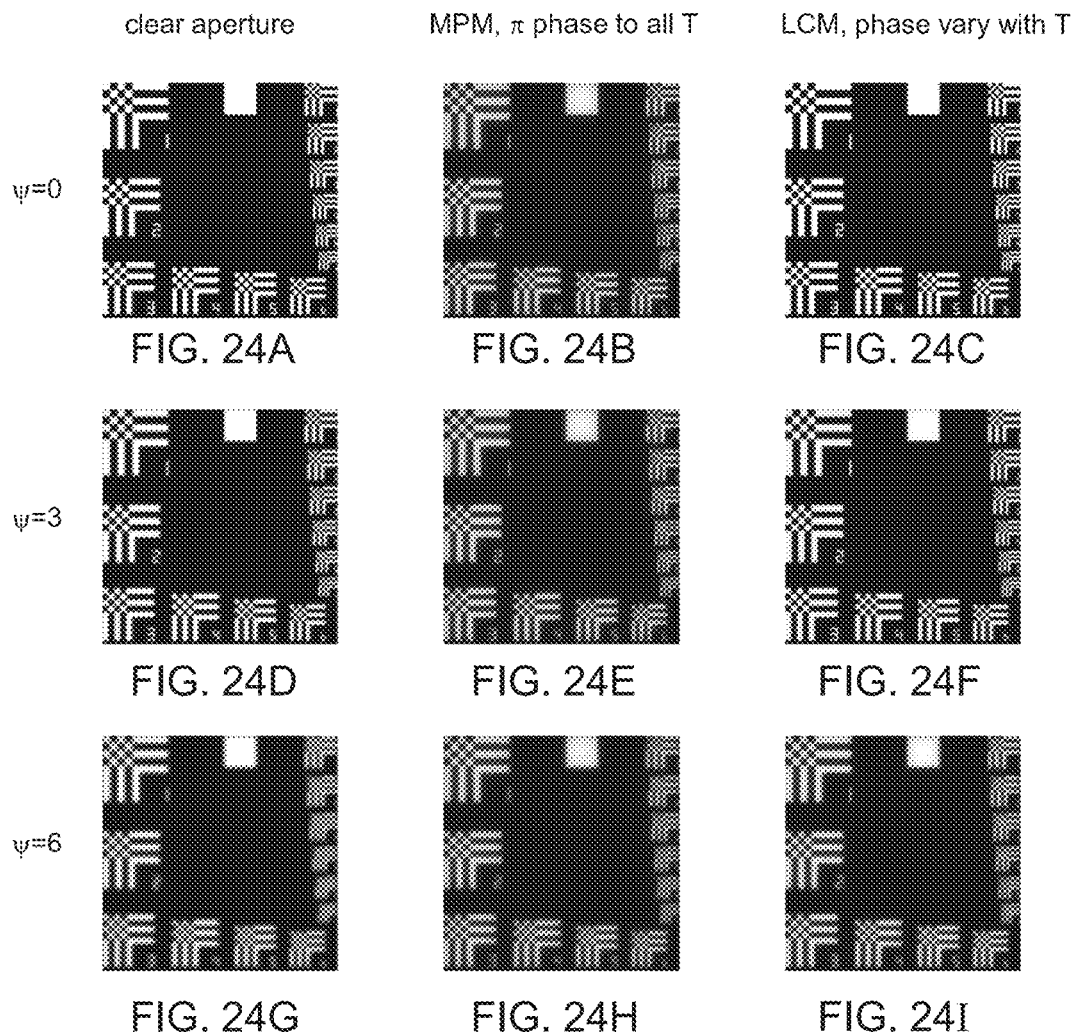

OPTICAL ELEMENT HAVING TWO PHASE MASKS

RELATED APPLICATIONS

This application is a National Phase of PCT Patent Application No. PCT/IL2014/050611 having International filing date of Jul. 8, 2014 which claims the benefit of priority under 35 USC § 119(c) of U.S. Provisional Patent Application No. 61/843,488 filed on Jul. 8, 2013. The contents of the above applications are all incorporated by reference as if fully set forth herein in their entirety.

FIELD AND BACKGROUND OF THE INVENTION

The present invention, in some embodiments thereof, relates to optics and, more particularly, but not exclusively, to an optical element having two phase masks, and to imaging by means of the optical element.

Use of phase masks to extend the Depth of Field (DOF) is known. Several methods for extending the DOF of an imaging system have been published.

Dowski et al., 1995, "Extended depth of field through wave-front coding," Applied Optics 34, 1859, discloses an optical-digital system which is a standard incoherent optical system modified by a phase mask with digital processing of the resulting intermediate image. The phase mask alters or codes the received incoherent wave front in such a way that the point-spread function and the optical transfer function do not change appreciably as a function of mis-focus.

Wang and Gan, 2001, "High focal depth with a pure phase apodizer," Applied Optics 40, 5658, disclose use of a pure-phase super resolution apodizers to optimize the axial intensity distribution and extend the DOF of an optical pickup.

Ben-Eliezer et al., 2008, "An optimal binary amplitude-phase mask for hybrid imaging systems that exhibit high resolution and extended depth of field," OPTICS EXPRESS, 20540, discloses a circularly symmetric hybrid imaging system. A pupil mask provides the largest spatial frequency band that assures a certain desired contrast value for a certain desired depth of field.

Also known is the use of combination of two diffractive optical elements. For example, S. M. Ebstein, 1996, "Nearly index-matched optics for aspherical, diffractive, and achromatic-phase diffractive elements," Optics Letters, Vol. 21, No. 18, 1454, discloses nearly index-matched optical elements that have application to aspherical, diffractive, and hybrid refractive-diffractive elements; and Arieli et al., 1998, "Design of a diffractive optical element for multiple wavelengths," Applied Optics, 37, No. 26, 6174, discloses a method for producing diffractive optical elements from two different optical materials, taking advantage of their different refractive indices and dispersions.

SUMMARY OF THE INVENTION

According to an aspect of some embodiments of the present invention there is provided an optical element. The optical element comprises: a first phase shift mask formed on a first optical material and constituted to generate a positive phase shift, and a second phase shift mask formed on a second optical material and constituted to generate a negative phase shift, wherein the phase shift masks are arranged serially on an optical axis, and wherein a refractive index of at least one of the first and second optical materials varies with the temperature at a rate of at least $50 \times 10^{-6}$ per degree Kelvin.

According to an aspect of some embodiments of the present invention there is provided an infrared imaging system. The infrared imaging system comprises an infrared camera and the optical element comprising: According to some embodiments of the invention the scene, passing the infrared light through an optical element to generate a phase shift in the infrared light, and capturing an infrared image constituted by the phase shifted infrared light, wherein the optical element comprises the optical element as delineated above of and optionally as further detailed below.

According to an aspect of some embodiments of the present invention there is provided a method of manufacturing an optical element. The method comprises: forming on a first optical material a first phase shift mask selected to generate a positive phase shift; forming on a second optical material a second phase shift mask selected to generate a negative phase shift; and positioning the phase shift masks serially on an optical axis; wherein a refractive index of at least one of the first and second optical materials varies with the temperature at a rate of at least $50 \times 10^{-6}$ per degree Kelvin.

According to some embodiments of the invention the phase shift masks are selected such that an infrared light beam passing through the optical element experiences mean square variations from the phase shift of no more than 5% over a wavelength range spanning over at least 0.2 micrometer.

According to some embodiments of the invention the phase shift masks are selected such that an infrared light beam passing through the optical element experiences mean square variations from the phase shift of no more than 5% over a temperature range of from about −20° C. to about +60° C.

According to some embodiments of the invention the phase shift masks are selected such that an infrared light beam passing through the optical element experiences mean square variations from the phase shift of no more than 5% over a temperature range of from about −10° C. to about +50° C.

According to some embodiments of the invention the phase shift masks are selected such that an infrared light beam passing through the optical element experiences a phase shift that is increased as a function of the temperature.

According to some embodiments of the invention the function of the temperature is a generally linear function.

According to some embodiments of the invention one of the first and second optical materials comprises germanium.

According to some embodiments of the invention the first material comprises germanium, and the second material comprises zinc sulfide.

According to some embodiments of the invention the first material comprises germanium, and the second material comprises zinc selenide.

According to some embodiments of the invention the first material comprises germanium, and the second material comprises silicon.

According to some embodiments of the invention the first material comprises Zinc Selenide, and the second material comprises silicon.

According to some embodiments of the invention the first mask forms an etched pattern of depth h1 in the first optical material, and the second mask forms a relief pattern of height h2 on the second optical material.

According to some embodiments of the invention the first optical material is characterized by a first refractive index having a first dependence $n_1(\lambda)$ on a wavelength $\lambda$ of light passing therethrough, and the second optical material is characterized by a second refractive index having a second dependence $n_2(\lambda)$ on the wavelength $\lambda$ of light passing therethrough, and wherein the optical materials, the depth $h_1$ and the height $h_2$ are selected such that the expression $n_1(\lambda)+(h_2/h_1)[n_2(\lambda)-1]$ is approximately linear with the wavelength.

According to some embodiments of the invention a difference between a refractive index characterizing the first optical material and a refractive index characterizing the second optical material is at least 0.1.

According to some embodiments of the invention a difference between an Abbe number characterizing the first optical material and an Abbe number characterizing the second optical material is at least 25.

According to some embodiments of the invention at least part of the wavelength range is in the near infrared range.

According to some embodiments of the invention at least part of the wavelength range is in the mid infrared range.

According to some embodiments of the invention at least part of the wavelength range is in the far infrared range.

According to an aspect of some embodiments of the present invention there is provided a method of scanning a color barcode having a plurality of colors spanning over a range of wavelengths. The method comprises, receiving light from the barcode, passing the light through an optical element to generate a phase shift in the light, and capturing an image constituted by the phase shifted light, wherein the optical comprises: a first phase shift mask formed on a first optical material and constituted to generate a positive phase shift, and a second phase shift mask formed on a second optical material and constituted to generate a negative phase shift, the phase shift masks being arranged serially on an optical axis, such that a light beam passing through the optical element experiences mean square variations from the phase shift of no more than 5% over a wavelength range spanning over the wavelength range.

According to some embodiments of the invention at least one of the first phase shift mask and the second phase shift mask comprises at least one ring pattern.

According to some embodiments of the invention at least one of the first phase shift mask and the second phase shift mask comprises a plurality of ring patterns.

According to some embodiments of the invention at least one of the first phase shift mask and the second phase shift mask comprises a plurality of concentric ring patterns.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a Monochromatic Phase Mask (MPM). The phase ring (hatched) provides a $\pi$-phase shift.

FIG. 2 shows a spectral response of the MPM of FIG. 1.

FIGS. 3A-3C show curves of Modulation Transfer Function (MTF) for clear aperture at $\psi=0$ (FIG. 3A), $\psi_G=3$ (FIG. 3B) and $\psi_G=6$ (FIG. 3C), as calculated according to some embodiments of the present invention for several wavelengths. The dashed line indicates the acceptable minimum contrast value of 5%.

FIGS. 4A-4C show curves of MTF for MPM at $\psi=0$ (FIG. 3A), $\psi_G=3$ (FIG. 3B) and $\psi_G=6$ (FIG. 3C), as calculated according to some embodiments of the present invention for several wavelengths. The dashed line indicates the acceptable minimum contrast value of 5%.

FIGS. 5A and 5B show results of an experiment performed according to embodiments of the present invention in which RGB Chess-Bar template was simulated as if imaged with a clear aperture system, for $\psi=0$. FIG. 5B shows the images and FIG. 5A shows contrast traces along the dashed lines in FIG. 5B.

FIGS. 6A and 6B show results of an experiment performed according to embodiments of the present invention in which RGB Chess-Bar template was simulated as if imaged with a clear aperture system, for $\psi_G=6$. FIG. 6B shows the images and FIG. 6A shows contrast traces along the dashed lines in FIG. 6B.

FIGS. 7A and 7B show results of an experiment performed according to embodiments of the present invention in which RGB Chess-Bar template was simulated as if imaged using an MPM, for ψ=0. FIG. 7B shows the images and FIG. 7A shows contrast traces along the dashed lines in FIG. 7B.

FIGS. 8A and 8B show results of an experiment performed according to embodiments of the present invention in which RGB Chess-Bar template was simulated as if imaged using an MPM, for $\psi_G$=6. FIG. 8B shows the images and FIG. 8A shows contrast traces along the dashed lines in FIG. 8B.

FIGS. 9A-9C show MTF for polychromatic mask at ψ=0 (FIG. 9A), $\psi_G$=3 (FIG. 9B) and $\psi_G$=6 (FIG. 9C), as calculated according to some embodiments of the present invention for several wavelengths. The dashed line indicates the acceptable minimum contrast value of 5%.

FIGS. 10A-10C show cut-off frequencies as a function of ψ for red (FIG. 10A) green (FIG. 10B) and blue (FIG. 10C) bands, obtained according to some embodiments of the present invention with clear aperture (solid lines), using MPM (dashed lines), and using a Polychromatic Composite Mask (solid line with dots).

FIGS. 11A and 11B show results of an experiment performed according to embodiments of the present invention in which RGB Chess-Bar template was simulated as if imaged with a Polychromatic Composite Mask (PCM), for ψ=0. FIG. 11B shows the images and FIG. 11A shows contrast traces along the dashed lines in FIG. 11B.

Figure 12A:
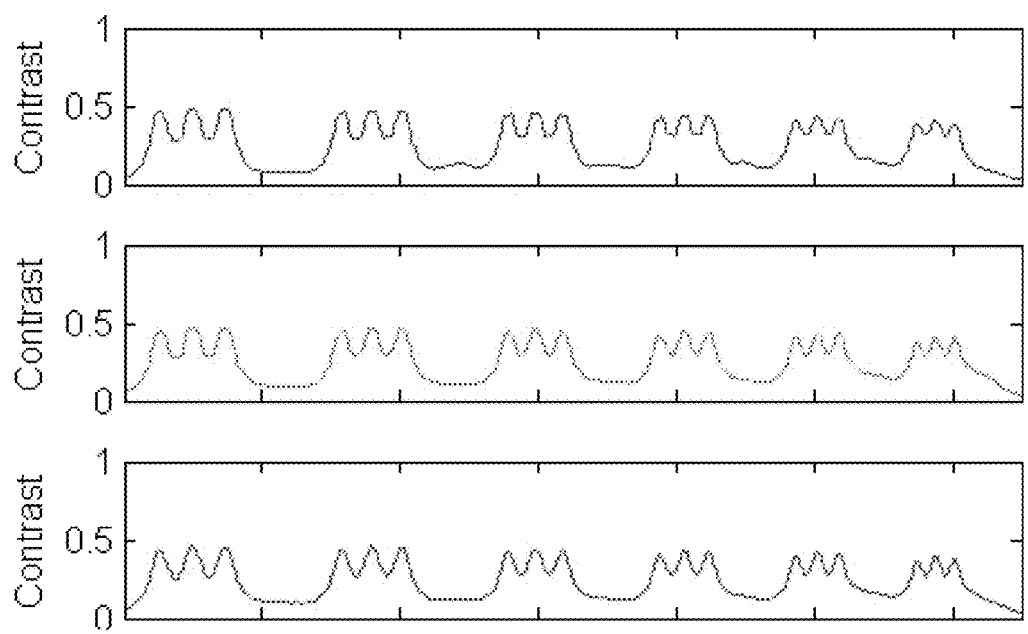
Figure 12B:
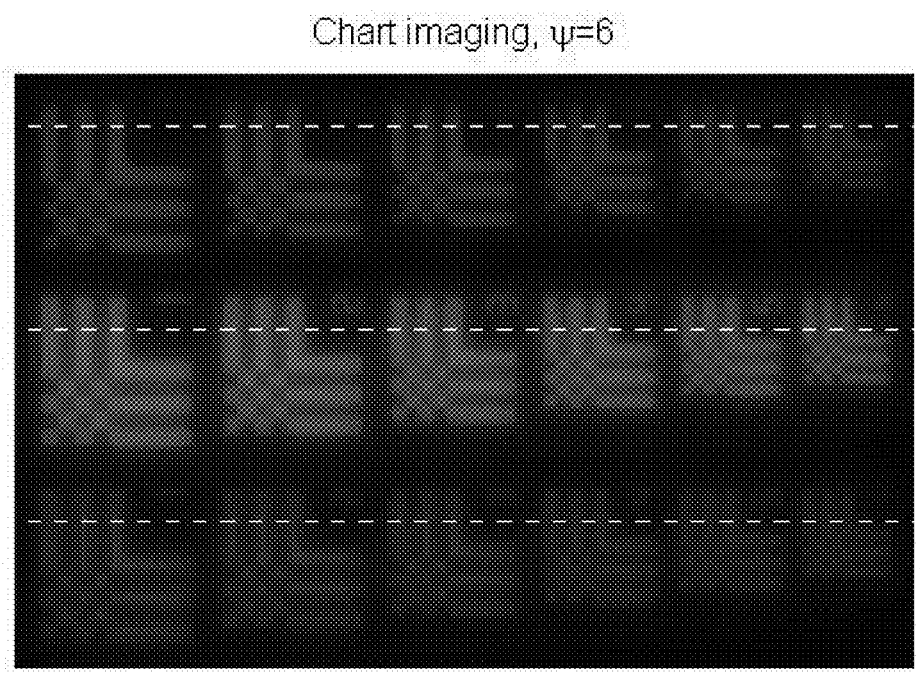

FIGS. 12A and 12B show results of an experiment performed according to embodiments of the present invention in which RGB Chess-Bar template was simulated as if imaged with a PCM, for $\psi_G$=6 (for the green light component). FIG. 12B shows the images and FIG. 12A shows contrast traces along the dashed lines in FIG. 12B.

Figure 13:
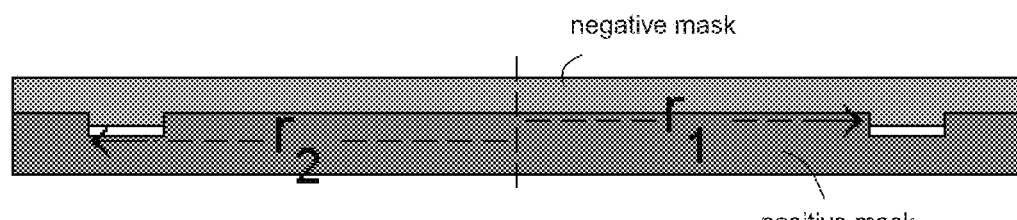

FIG. 13 is a schematic illustration showing a cross section of a PCM according to some embodiments of the present invention. In the illustrated embodiments, both parts of the mask have the same ring radius. In the positive part (lower part of FIG. 13) the ring is etched into the substrate, and in the negative mask (upper part of FIG. 13) the surrounding area is etched to form a relief pattern shaped as a ring.

Figure 14:
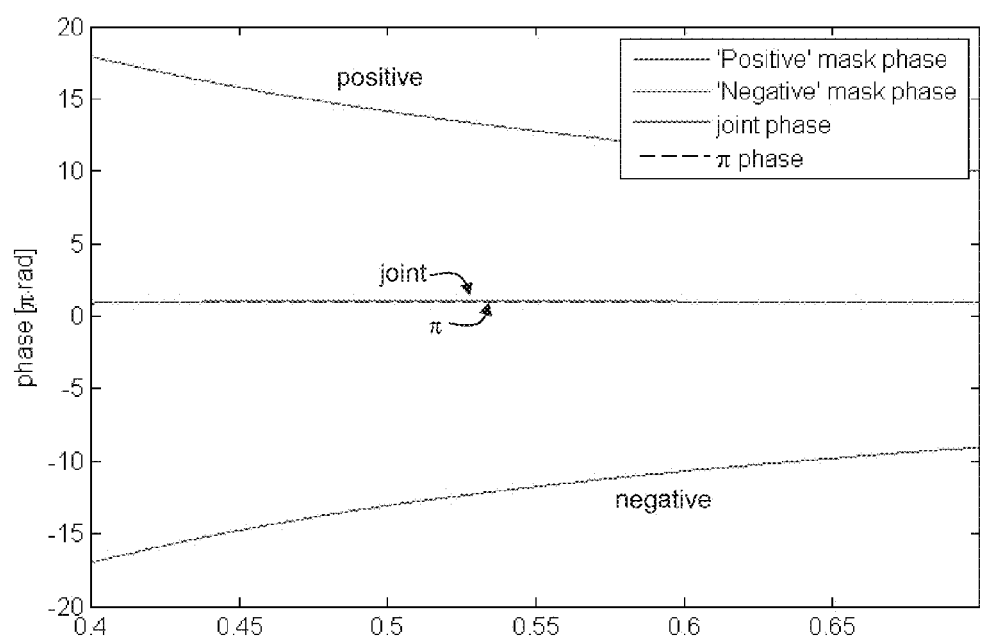

FIG. 14 shows phase shift profiles as a function of the wavelength over the visible range, for a PCM of some embodiments of the present invention.

Figure 15:
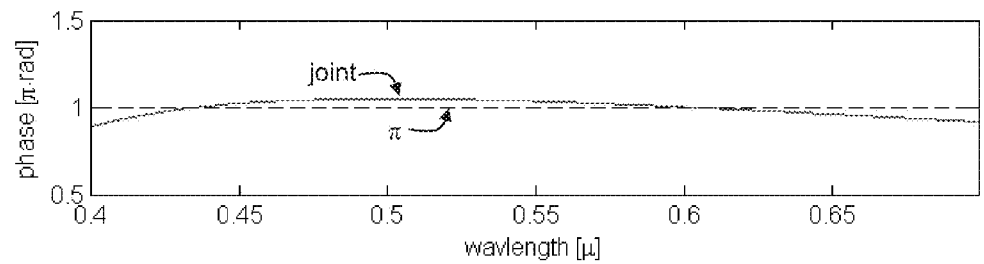

FIG. 15 is a zoom-in version of FIG. 14, showing the profile of the joint phase shift compared to a π phases.

FIGS. 16A-16C show MTF for clear aperture and MPM at ψ=0 (FIG. 16A), ψ=3 (FIG. 16B) and ψ=6 (FIG. 16C).

Figure 17A:
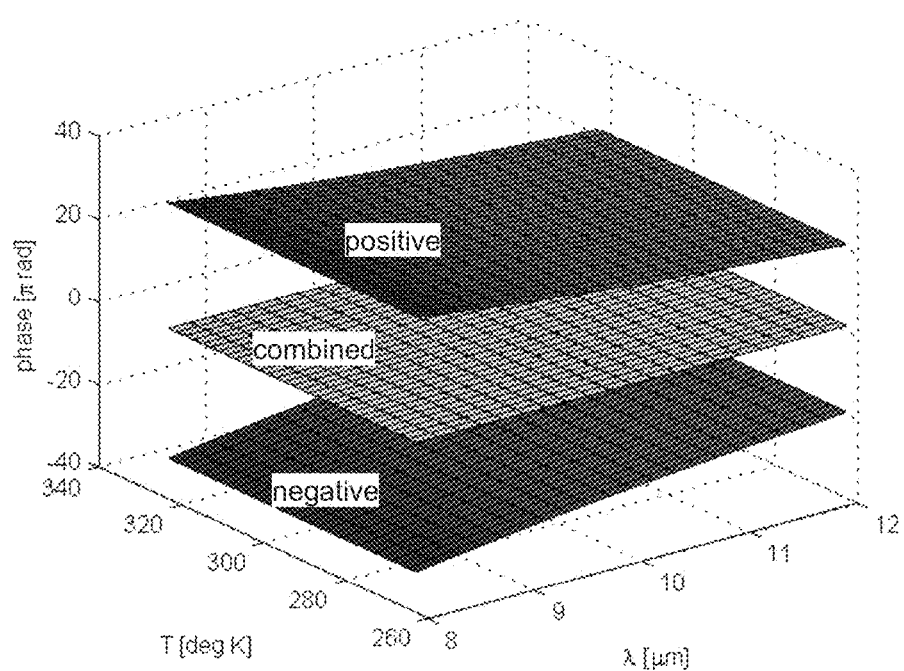
Figure 17B:
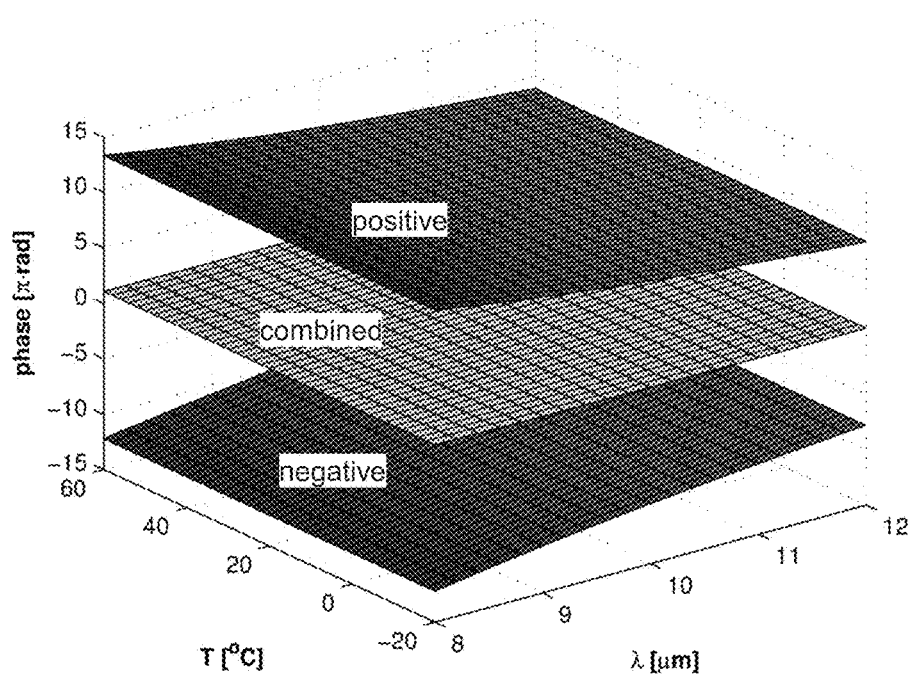

FIGS. 17A and 17B are three-dimensional plots, showing phase shifts of composite mask for IR lens athermalization as a function of the wavelength and temperature, according to some embodiments of the present invention.

Figure 18A:
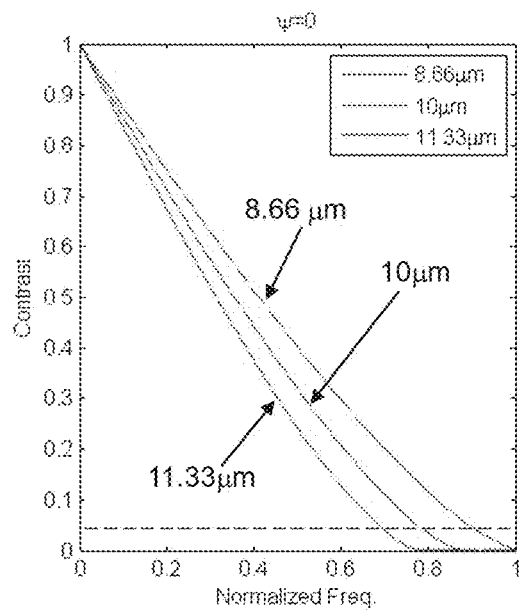
Figure 18B:
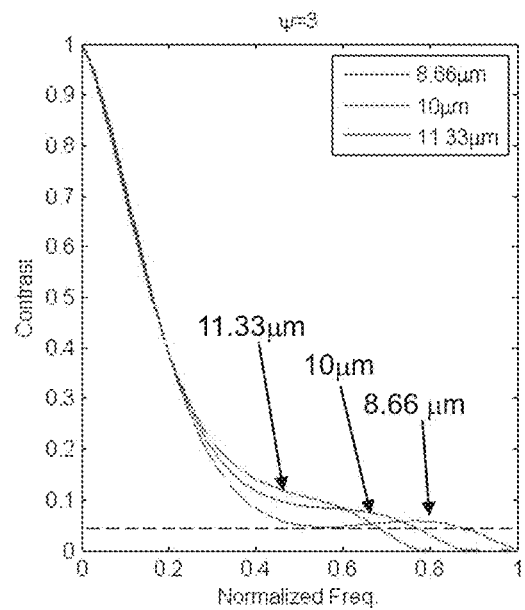
Figure 18C:
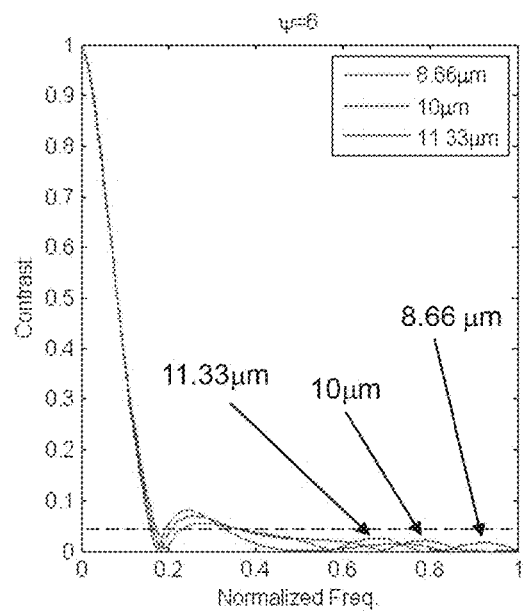

FIGS. 18A-18C show curves of MTF for clear aperture, with temperature variations corresponding to ψ=0 (FIG. 18A), ψ=3 (FIG. 18B), and ψ=6 (FIG. 18C), as calculated according to some embodiments of the present invention for several wavelengths. The recited values of ψ were evaluated for λ=10 μm.

FIGS. 19A-19C show curves of MTF for MPM, with temperature variations corresponding to ψ=0 (FIG. 19A), ψ=3 (FIG. 19B), and ψ=6 (FIG. 19C), as calculated according to some embodiments of the present invention for several wavelengths. The recited values of ψ were evaluated for λ=10 μm.

FIGS. 20A-20C show curves of MTF for IR PCM, with temperature variations corresponding to ψ=0 (FIG. 20A), ψ=3 (FIG. 20B), and ψ=6 (FIG. 20C), as calculated according to some embodiments of the present invention for several wavelengths. The recited values of ψ were evaluated for λ=10 μm.

Figure 21A:
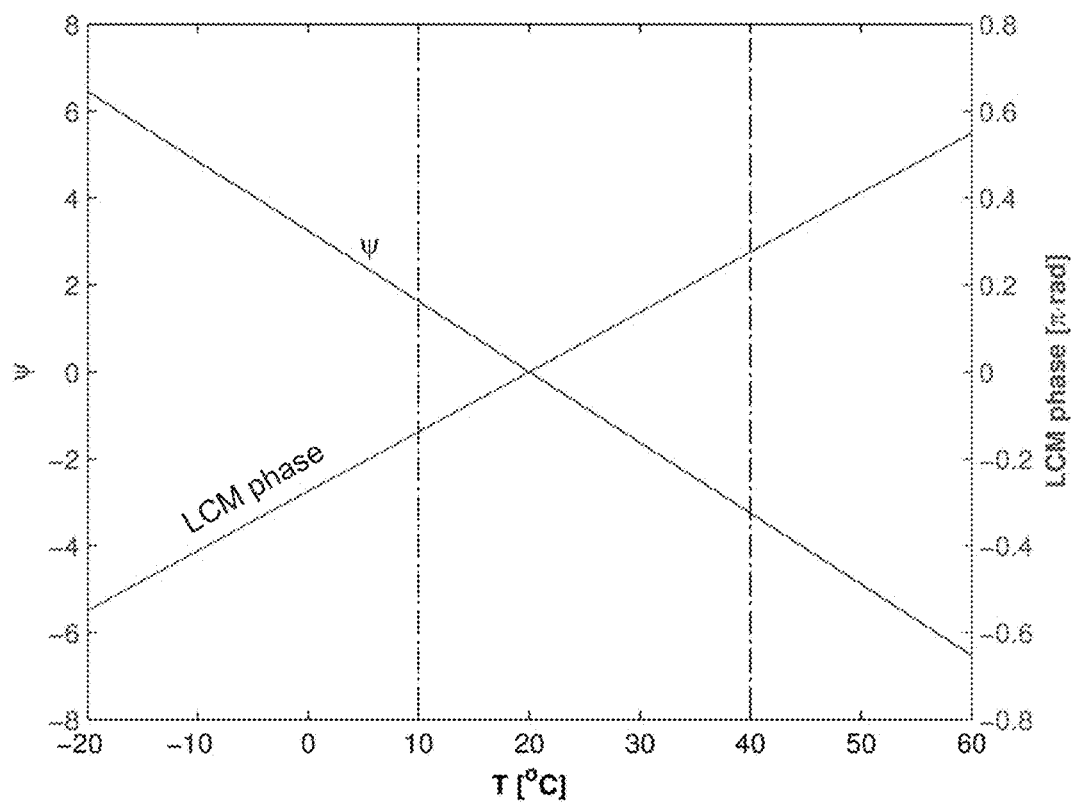
Figure 21B:
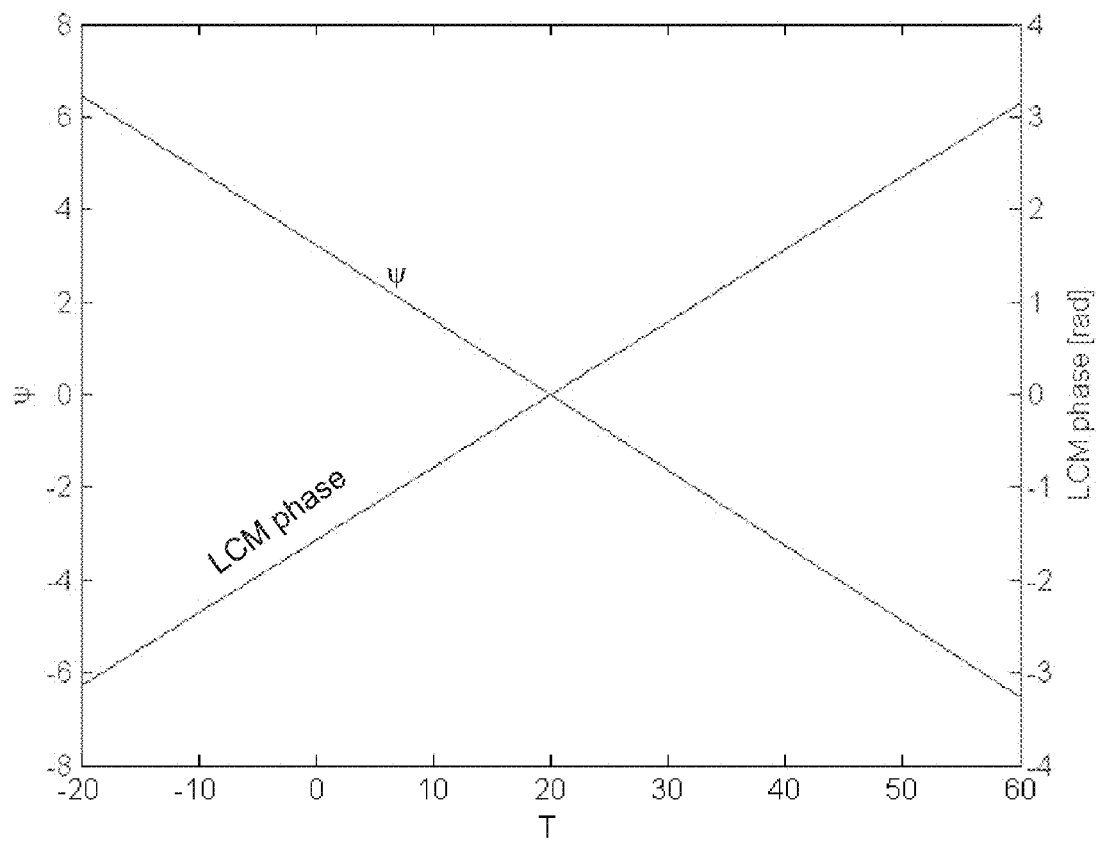
Figure 23A:
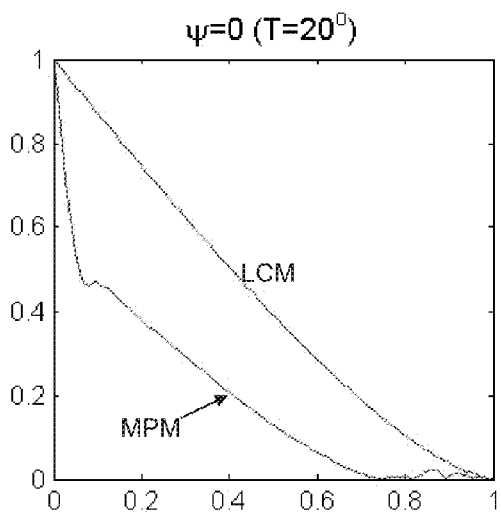
Figure 23B:
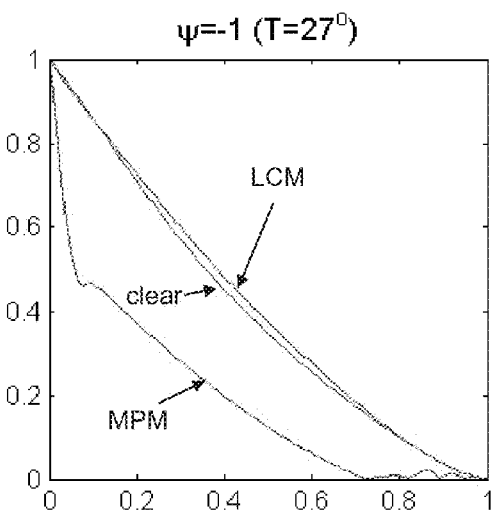
Figure 23C:
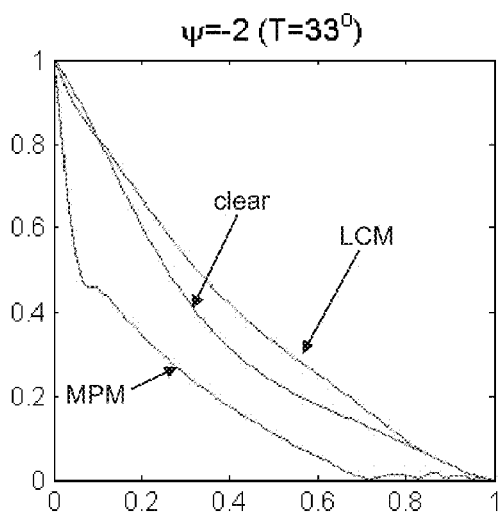
Figure 23D:
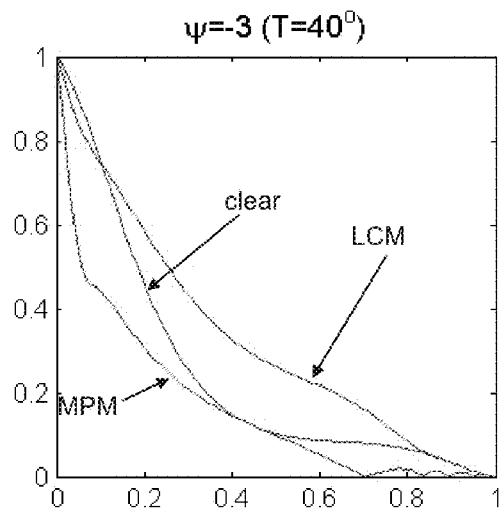
Figure 23E:
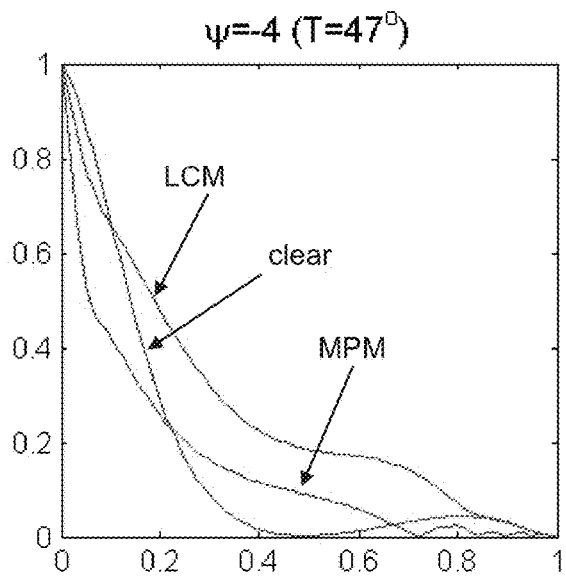
Figure 23F:
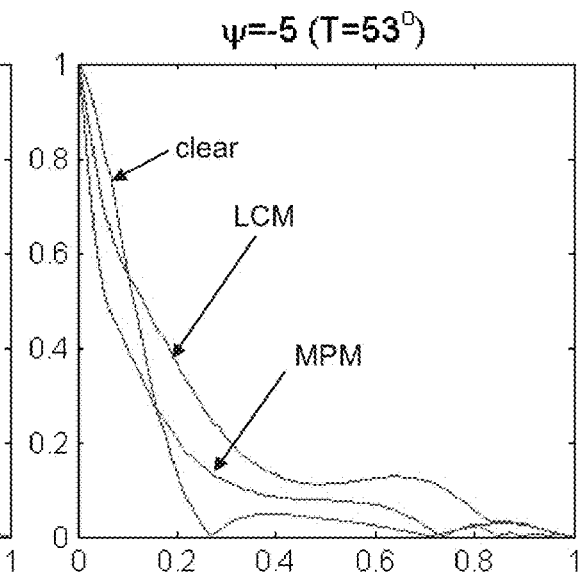
Figure 23G:
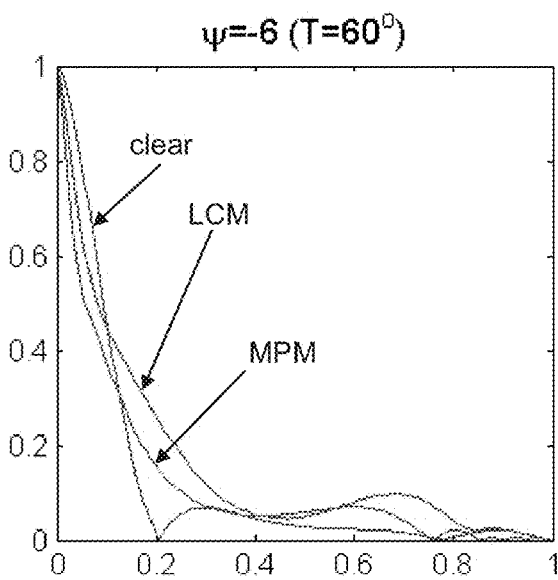

FIGS. 21A and 21B are graphs showing ψ and the phase shift provided by a phase mask, as a function of the temperature, as obtained according to embodiments of the present invention in which the phase shift varies generally linear with the temperature.

FIGS. 22A-22D show pupil phase shift as obtained for embodiments of the present invention in which the phase shift varies generally linear with the temperature.

FIGS. 23A-23G show curves of MTF for clear aperture, MPM and LCM, as obtained according to some embodiments of the present invention for various defocus conditions.

FIGS. 24A-24I show results of an experiment performed according to embodiments of the present invention in which a Chess-Bar resolution target was simulated as if imaged with clear aperture (FIGS. 24A, 24D and 24G), MPM (FIGS. 24B, 24E and 24H) and LCM (FIGS. 24C, 24F and 24I), for ψ=0 (FIGS. 24A-24C), for ψ=3 (FIGS. 24D-24F) and for ψ=6 (FIGS. 24G-24I).

Figures 25A, 25B, 25C, 25D, 25E, 25F, 25G, 25H, 25I:
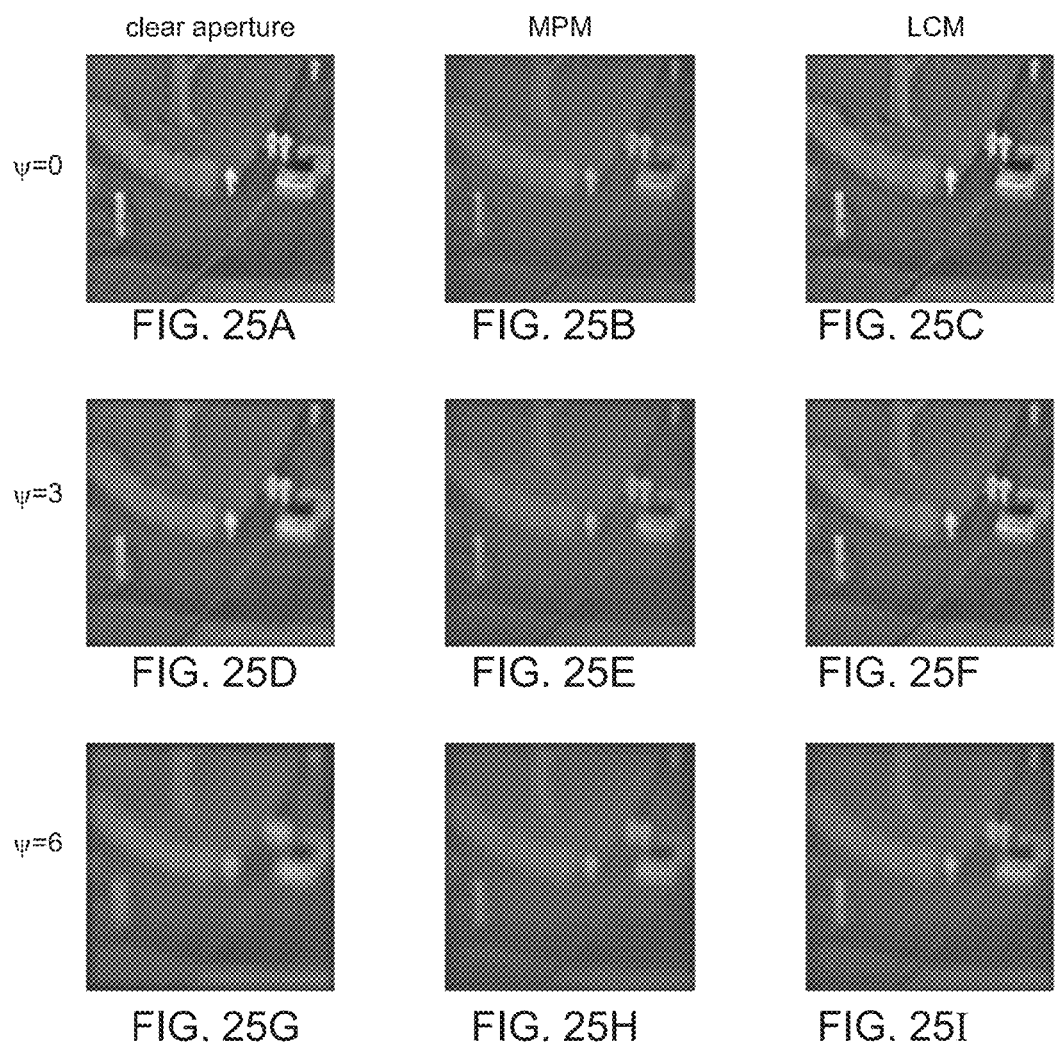

FIGS. 25A-25I show results of an experiment performed according to embodiments of the present invention in which an IR image of a scene was simulated as if imaged with a clear aperture (FIGS. 25A, 25D and 25G), MPM (FIGS. 25B, 25E and 25H) and LCM (FIGS. 25C, 25F and 25I), for ψ=0 (FIGS. 25A-25C), for ψ=3 (FIGS. 25D-25F) and for ψ=6 (FIGS. 25G-25I). The IR image was taken from 'IEEE OTCBVS WS Series Bench' database, in courtesy of J. Davis and M. Keck.

Figure 26:
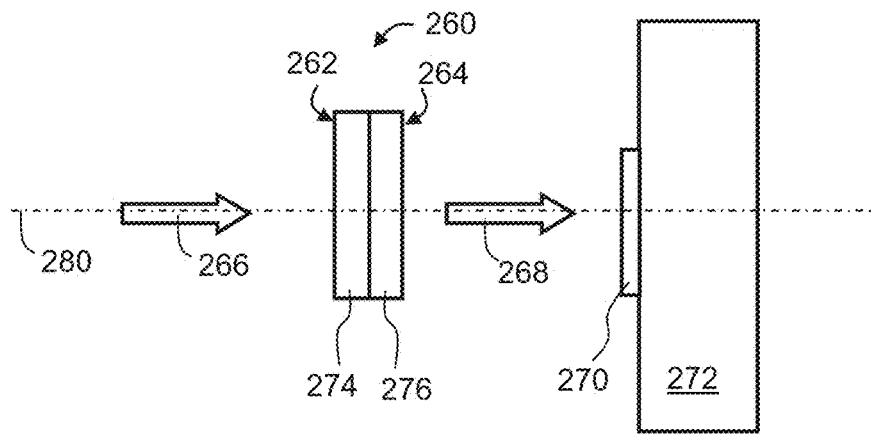

FIG. 26 is a schematic illustration of an optical element, according to some embodiments of the present invention.

Figure 27:
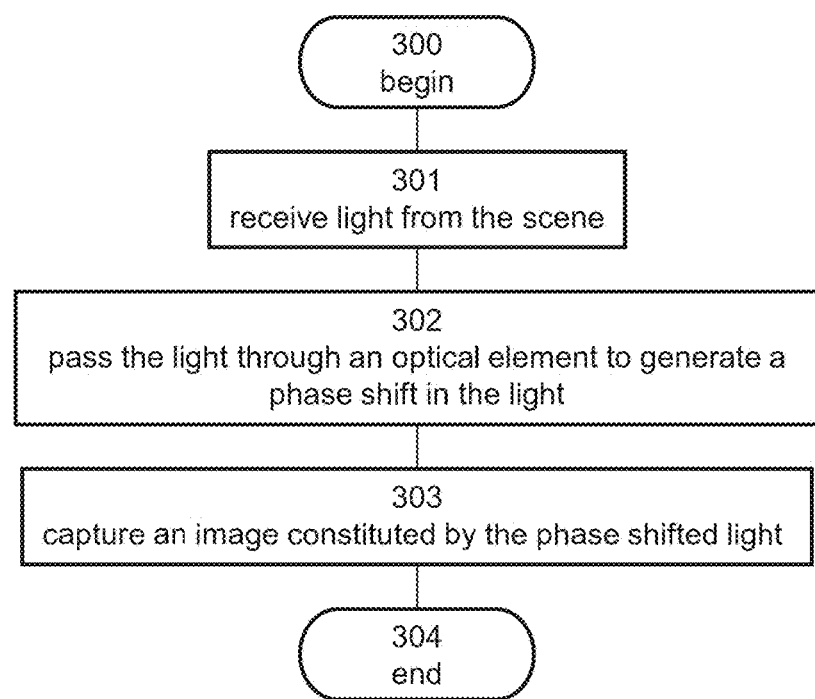

FIG. 27 is a flowchart diagram illustrating a method suitable for imaging a scene, according to some embodiments of the present invention.

Figure 28:
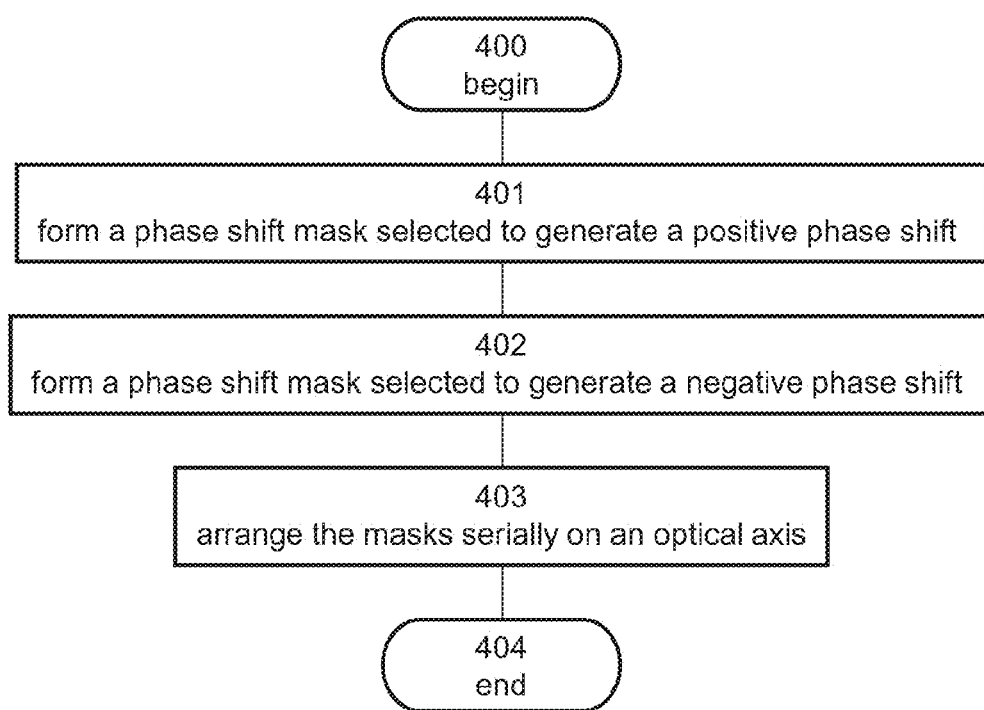

FIG. 28 is a flowchart diagram illustrating a method suitable for manufacturing an optical element, according to some embodiments of the present invention.

DESCRIPTION OF SPECIFIC EMBODIMENTS OF THE INVENTION

The present invention, in some embodiments thereof, relates to optics and, more particularly, but not exclusively, to an optical element having two phase masks, and to imaging by means of the optical element.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 26 illustrates an optical element 260, according to some embodiments of the present invention. Optical element 260 can be used for modifying a light beam passing therethrough. In particular, optical element 260 can be used for changing the phase of the light beam, thus generating a phase shift between the phase of the beam at the entry side 262 of element 260 and the phase of the beam at the exit side 264 of element 260. The light beam before entering element 260 is illustrated as a block arrow 266 and the light beam after exiting element 260 is illustrated as a block arrow 268.

According to some embodiments of the invention at least part of the wavelength range of the incoming light beam 266 and outgoing light beam 268 is in the near infrared range, e.g., from about 0.7 to about 2.5 micrometers.

According to some embodiments of the invention at least part of the wavelength range of the incoming light beam 266 and outgoing light beam 268 is in the mid infrared range, e.g., from about 3 to about 5 micrometers.

According to some embodiments of the invention at least part of the wavelength range of the incoming light beam 266 and outgoing light beam 268 is in the far infrared range, e.g., from about 8 to about 14 micrometers.

Optical element 260 can be placed, for example, in front of the pupil 270 of an optical system 272, such as, but not limited to, an optoelectronic system, an imaging system, e.g., an infrared or visible light camera, a barcode scanner, and the like. These embodiments are particularly useful when it is desired to extend the characteristic DOF of the optical system, and/or when it is desired to athermalize the optical system.

As used herein "depth of field" refers to a range of distances measured from the aperture of the optical system in a direction along the optical axis of the optical system, wherein an image of any object that is imaged by optical system and that is located at a distance within that range of distances, is characterized by a defocus parameter $\psi$ having an absolute value $|\psi|$ which is less than a predetermined threshold.

A defocus parameter is a well-known quantity and is defined mathematically in EQ. (1) of the Examples section that follows. For this definition, the predetermined threshold that defines the DOF can be at most 1.5 or at most 1 or at most 0.5.

As used herein athermalization refers to the correction of a thermal-induced focal shift in the optical system.

In various exemplary embodiments of the invention an optical element 260 comprises a first phase shift mask 274 constituted to generate a positive phase shift, and a second phase shift mask 276 constituted to generate a negative phase shift. In some embodiments of the present invention, mask 274 exhibits a dispersion which is lower than the dispersion exhibited by mask 276. The dispersion is typically characterized by a measure known as Abbe number. The Abbe number expresses the extent to which the shorter and longer wavelengths of light are separated by refraction through the respective material. Thus, in the present embodiments, the Abbe number of mask 274, when defined for particular values of shorter and longer wavelengths, is lower than the Abbe number of mask 276, when defined for the same values of shorter and longer wavelengths.

First phase shift mask 274 and second phase shift mask 276 are arranged serially on an optical axis 280. Masks 274 and 276 are illustrated as contacting each other, but this not necessarily be the case since optical element 260 can have a gap, e.g., air gap between masks 274 and 276. Each of masks 274 and 276 is formed on a different optical material. The optical material on which mask 274 is formed is referred to as the first optical material, and optical material on which mask 276 is formed is referred to as the second optical material.

As used herein "negative phase shift" refers to a phase difference $\Delta\varphi \leq \pi$ between beams 268 and 266 wherein the phase of beam 268 is retarded by $\Delta\varphi$ relative to the phase of beam 266.

As used herein "positive phase shift" refers to a phase difference $\Delta\varphi \leq \pi$ between beams 268 and 266 wherein the phase of beam 268 is advanced by $\Delta\varphi$ relative to the phase of beam 266.

The refractive index of at least one of, more preferably both, the optical materials optionally and preferably varies with the temperature at a rate of at least $40 \times 10^{-6}$ or at least $50 \times 10^{-6}$ or at least $60 \times 10^{-6}$ or at least $70 \times 10^{-6}$ or at least $80 \times 10^{-6}$ or at least $90 \times 10^{-6}$ or at least $100 \times 10^{-6}$ per degree Kelvin. A list of materials suitable for the present embodiments is provided in Table 3 of the Examples section that follows.

According to some embodiments of the invention a difference between a refractive index characterizing the first optical material and a refractive index characterizing the second optical material is at least 0.1 or at least 0.2 or at least 0.3 or at least 0.4 or at least 0.5.

According to some embodiments of the invention a difference between an Abbe number characterizing the first optical material and an Abbe number characterizing the second optical material is at least 25 or at least 30 or at least 35 or at least 40 or at least 50 or at least 60 or at least 70 or at least 80.

In some embodiments of the present invention one of first and second optical materials comprises germanium. For example, the first material can comprise germanium, and the second material can comprise zinc sulfide. Another example is an optical element in which the first material comprises germanium, and the second material comprises zinc selenide. Another example is an optical element in which the first material comprises germanium, and the second material comprises silicon. Another example is an optical element in which the first material comprises Zinc Selenide, and the second material comprises silicon. Other combinations of materials (e.g., selected pairs of materials from Table 3) are also contemplated.

Figure 1:
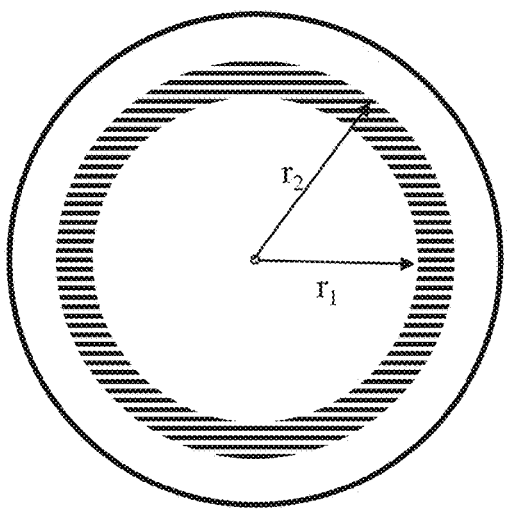

Each optical mask is optionally and preferably constituted as a pattern on the respective optical material. The pattern can include one or more rings, where each ring is characterized by an inner radius $r_1$ and an outer radius $r_2$. A representative single-ring pattern, which is not to be considered as limiting, is shown in FIG. 1. Unlike conventional optical elements in which such a single-ring pattern is formed on one optical material, in the optical element of the present embodiments the pattern is optionally and preferably formed on each of the first and second optical materials, albeit with different combination of $r_1$ and $r_2$. Patterns with more than one rings are also contemplated for at least one, more preferably all, the optical materials that constitute the optical element.

The pattern can be formed as a relief or as a groove on the respective material. In various exemplary embodiments of the invention the pattern on one mask is formed as a relief and the pattern on the other mask is formed as a groove. The pattern can be formed on the side of the respective material that receives the light beam or on the side of the respective material from which the light beam exits.

In some embodiments of the present invention the first mask forms an etched pattern (a groove) of depth $h_1$ in first optical material, and second mask forms a relief pattern of height $h_2$ on second optical material. In exemplary embodiments of the invention both $h_1$ and $h_2$ are less than 500 micrometers. As a representative example, which is not to be considered as limiting, the masks can provide a phase shift of about $\pi$ radians, the first optical material can be germanium, the second optical material can be zinc sulfide, $h_1$ can be about 18 micrometers, and $h_2$ can be about 40 micrometers.

In some embodiments, the materials, depth $h_1$ and height $h_2$ are selected such that the expression $n_1(\lambda)+(h_2/h_1)[n_2(\lambda)-1]$ is approximately linear with the wavelength $\lambda$ of the light beam that passes through element 260, over a predetermined wavelength range $\Delta\lambda$, where $n_1(\lambda)$ and $n_2(\lambda)$ are the dependences of the refractive indices of the first and the second materials, respectively, on $\lambda$.

As used herein, "generally linear" or "approximately linear" means a deviation from linearity of less than 10% over a specified range of the respective variable (e.g., wavelength, temperature).

For any one of the embodiments described herein, the predetermined wavelength range $\Delta\lambda$ can be at least 0.1 micrometer or at least 0.2 micrometers or at least 0.3 micrometers or at least 0.4 micrometers or at least 0.5 micrometers or at least 1 micrometer or at least 2 micrometers or at least 3 micrometers or at least 4 micrometers or at least 5 micrometers.

In some embodiments of the present invention, a light beam (e.g., infrared light beam, polychromatic visible light beam) passing through optical element 260 experiences mean square variations from the phase shift of no more than 5% or no more than 4% or no more than 3% over the wavelength range $\Delta\lambda$; and in some embodiments of the present invention, an infrared light beam passing through the phase shift masks experiences a maximal phase shift variation of no more than 15% or no more than 14% or no more than 13% or no more than 12% or no more than 11% or no more than 10% over the wavelength range $\Delta\lambda$.

These embodiments are particularly useful when it is desired to have an optical element that provides approximately the same phase shift across the entire illumination bandwidth that is expected to pass through element 260. Representative example of materials and radii suitable for providing such phase shifts are provided in the Examples section that follows (see Example 2).

In some embodiments of the present invention the phase shift masks are selected such that an infrared light beam passing through optical element 260 experiences mean square variations from the phase shift of no more than 5% or no more than 4% or no more than 3% over a predetermined temperature range $\Delta T$ and, optionally and preferably, also over the predetermined wavelength range $\Delta\lambda$; and in some embodiments of the present invention, an infrared light beam passing through optical element 260 experiences a maximal phase shift variation of no more than 15% or no more than 14% or no more than 13% or no more than 12% or no more than 11% or no more than 10% over the predetermined temperature range $\Delta T$ and, optionally and preferably, also over the predetermined wavelength range $\Delta\lambda$.

These embodiments are particularly useful when it is desired to have an optical element for athermalization that provides approximately the same phase shift across a range of temperatures at which the optical system is expected to operate. Representative example of materials and radii suitable for providing such phase shifts are provided in the Examples section that follows (see Example 3).

For any one of the embodiments described herein, the predetermined temperature range $\Delta T$ can be from about −20° C. to about +60° C. or from about −15° C. to about +60° C. or from about −20° C. to about +55° C. or from about −15° C. to about +55° C. or from about −10° C. to about +55° C. or from about −15° C. to about +50° C. or from about −10° C. to about +50° C.

In some embodiments of the present invention the phase shift masks are selected such that an infrared light beam passing through optical element 260 experiences a phase shift that is increased as a function, such as, but not limited to, a generally linear function, of the temperature.

These embodiments are particularly useful when it is desired to have an optical element for athermalization wherein the performance of the system is improved for out-of-focus condition (e.g., $|\psi|>1$), and is generally maintained in in-focus conditions (e.g., $|\psi|\leq 1$). Representative example of materials and radii suitable for providing such phase shifts are provided in the Examples section that follows (see Example 4).

Reference is now made to FIG. 27 which is a flowchart diagram illustrating a method suitable for imaging a scene, according to some embodiments of the present invention. The method begins at 300 and continues to 301 at which light, e.g., infrared light is received from the scene. The method continues to 302 at which the light is passed through an optical element, e.g., element 260 to generate a phase shift in the infrared light. The method continues to 303 at which an imaged, e.g., an infrared image, constituted by phase shifted light is captured.

The method ends at 304.

The method can also be used for scanning a color barcode having a plurality of colors spanning over a range of wavelengths. In these embodiments, the scene is the barcode, and the light can be received by scanning the barcode.

Reference is now made to FIG. 28 which is a flowchart diagram illustrating a method suitable for manufacturing an optical element, according to some embodiments of the present invention. The optical element can be element 260. The method begins at 400 and continues to 401 at which a first phase shift mask selected to generate a positive phase shift is formed on a first optical material. The method continues to 402 at which a second phase shift mask selected to generate a negative phase shift is formed on a second optical material. The first and second phase shifts mask can be formed by etching the respective material, so as to form a groove or a relief pattern as desired. The method optionally and preferably continues to 403 at which the two masks are arranged serially on an optical axis.

The method ends at 404.

The optical element of the present embodiments is advantageous over conventional techniques. Phase elements are described in Refs. [5] and [6]. The present inventors found that these elements have some limitations.

Ebstein [5] presented the method of "Nearly Index Matched" (NIM) Optics®. According to this method one can design a polychromatic Diffractive Optical Element (DOE) by using two types of optical materials. According to Ebstein, one should choose two materials with very close refractive index ("Nearly Index-Matched"-materials); the desired profile should be produced on one of them, and the exact inverse profile on the other. When pressing the two layers one against the other, the 'effective' layer behaves like a material with refractive index. The effective refractive index is very low, and therefore this layer needs to be very thick. By selecting both glasses with different dispersion properties, the effective refractive index of the layer behaves as almost constant for every wavelength in the desired band, thus making the phase element with almost constant phase for the entire illumination BW.

The optical element of the present embodiments is advantageous over Ebstein's technique. Unlike [5], the optical element of the present embodiments consists of two layers that are not necessarily pressed into each other, wherein each layer profile is set independent of the other. This is advantageous because there is no constraint on the materials to be "Nearly Index-Matched", so that a wider variety of material pairs can be selected. Additionally, the effective refractive index of the 'active' layer is much higher, and thus the layer is much thinner.

Arieli [6] designed two profiles with two types of optical materials. The profiles are not pressed together, so that each layer height or depth can be set independently. Following some design equations presented in [6], a DOE with identical phase for two wavelengths could be achieved. It was found by the present Inventors that this design cannot be applied for a band of wavelengths. In order to achieve identical phase for more wavelengths, a more complex design is presented, using 4 types of materials, so that identical phase for 4 wavelengths is achieved. In [6], the design is done by solving a linear equation system. Thus, the heights are set in such a way that the elements would exhibit the same phase for two wavelengths only, with consequential phase variations for any other wavelengths.

In the optical element of the present embodiments the MSE is small. This can be achieved, for example, by setting the height and/or depth of the patterns according to an optimization criterion [e.g., the criterion presented in Eq. (7), below].

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a material" or "at least one material" may include a plurality of materials, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Exemplified Monochromatic Phase Mask (MPM)

The mask presented in [1] is made of concentric phase rings (see FIG. 1), exhibiting π-phase shift for a certain wavelength (within the wavelength band). The out-of-focus condition of imaging systems is measured in terms of the defocus parameter $\psi$, defined as:

$$\psi = \frac{\pi R^2}{\lambda} \left( \frac{1}{z_{img}} + \frac{1}{z_{obj}} - \frac{1}{f} \right) \qquad \text{EQ. (1)}$$

where $\lambda$ is the wavelength, R is the pupil radius, $z_{img}$, $z_{obj}$ are the image and object distances, and f is the imaging system focal length.

After setting the extent of the desired $\psi$ range and the acceptable minimum contrast of the resulting image, the number of phase rings to implement in the mask can be selected, and the appropriate rings' radii can be determined by solving the following optimization process:

$$\max_r \min_{\psi \in DOF} [\nu : MTF(\nu, r, \psi) = C_d] \qquad \text{EQ. (2)}$$

where r is the mask radii vector, $\psi$ is the defocus measure, $\nu$ is the spatial frequency, and $C_d$ is the desired acceptable minimum contrast value.

The solution to the optimization process expressed in EQ. (2) includes the ring radii that maximize the minimum (worst) cut-off frequency along the entire DOF under consideration. The cut-off frequency is optionally and preferably determined for the acceptable minimum contrast value. Defining the cut-off frequency for zero contrast, is also contemplated. The optimization goal to extend the cut-off frequency for the acceptable minimum contrast value is preferred and particularly useful in situations in which post-processing techniques can enhance existing contrast in the optical image, e.g., when it is above a minimal level. Image data with contrast below that level is typically considered lost, and is not restored "a-posteriori".

It is to be understood that other considerations in the design of the optical system can result in another optimization goal (e.g., maximize the area under the MTF), and the cut-off frequency extension criterion can be taken as a test case, as done, for example, in [1].

Since $\pm\pi$ phase shifts are indistinguishable, the mask provides symmetric performance around the in-focus position. Out of the many cases presented in [1], a single ring mask for $\psi_{max}=6$ and a minimum contrast $C_d=5\%$ is selected in the present example as a test case. The ordinarily skilled person can apply the analysis and design methods presented below for any other choice.

MPM Spectral Response and White Light Imaging Performance

Figure 2:
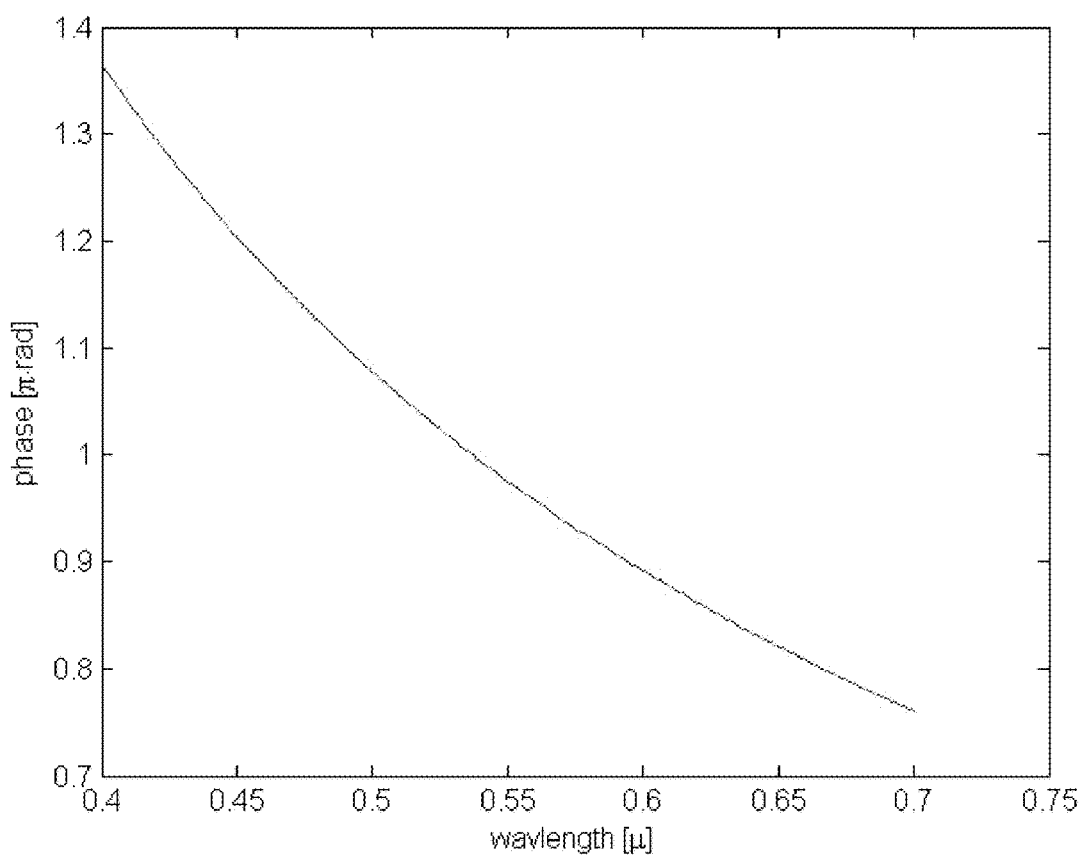

The MPM is designed for a certain wavelength. The phase shift provided by the mask for every wavelength other than that single wavelength is different, since:

$$\varphi_{mask} = \frac{2\pi}{\lambda} h(n(\lambda) - 1) \qquad \text{EQ. (3)}$$

where h is the ring's height/depth, $n(\lambda)$ is the wavelength-dependent refractive index, and $\varphi_{mask}$ is the resulting phase shift. The variation of the ring phase shift as a function of the wavelength is presented in FIG. 2 for the case of $\varphi(\lambda=550$ nm$)=\pi$.

Wavelength variations affect not only the phase shift (see, e.g., FIG. 2) but also the extent of the defocus, since the defocus parameter $\psi$ varies with $\lambda$ (for the same imaging conditions, see EQ. (1)).

Figure 4A:
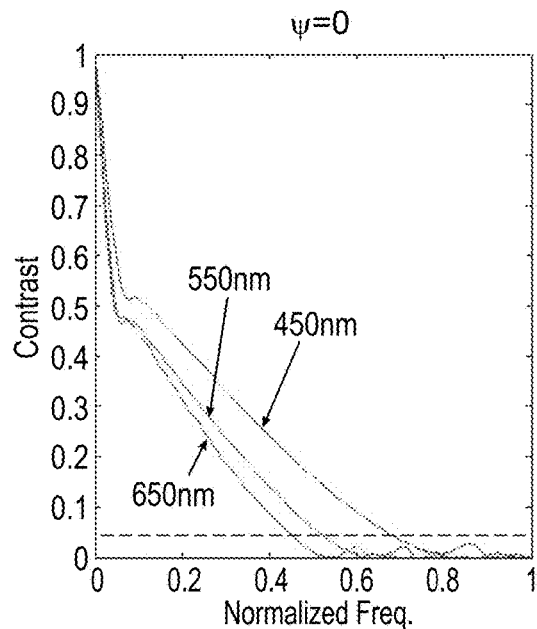
Figure 4B:
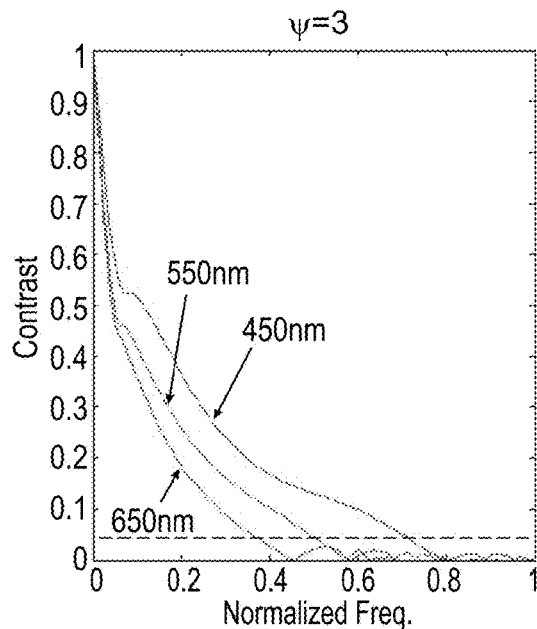
Figure 4C:
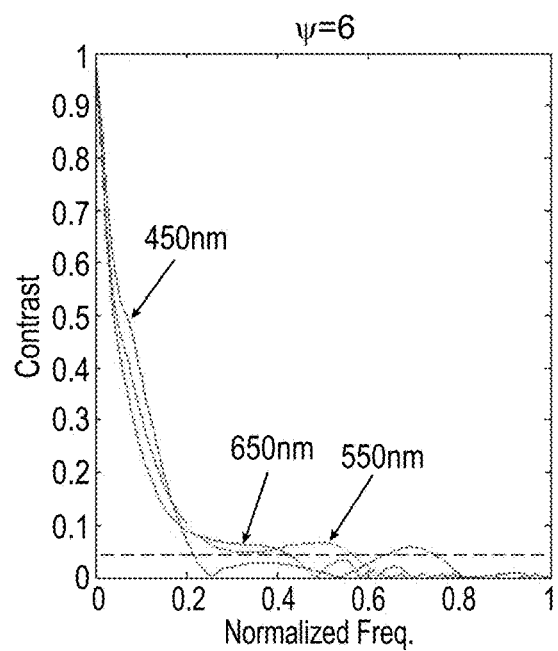
Figure 5A:
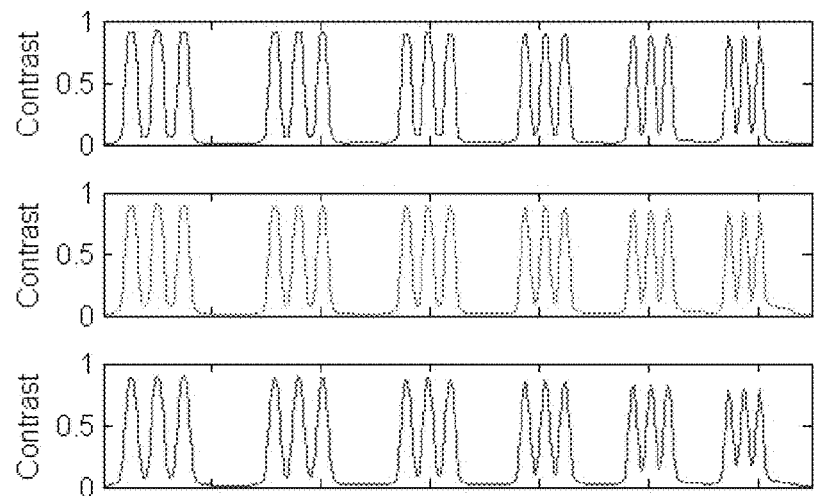
Figure 5B:
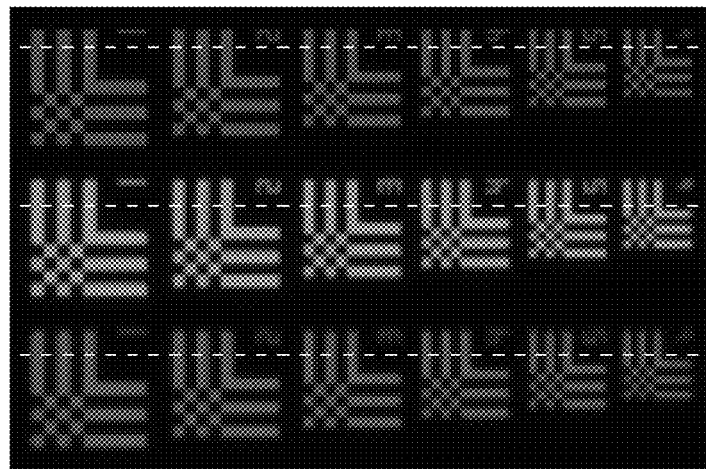
Figure 6A:
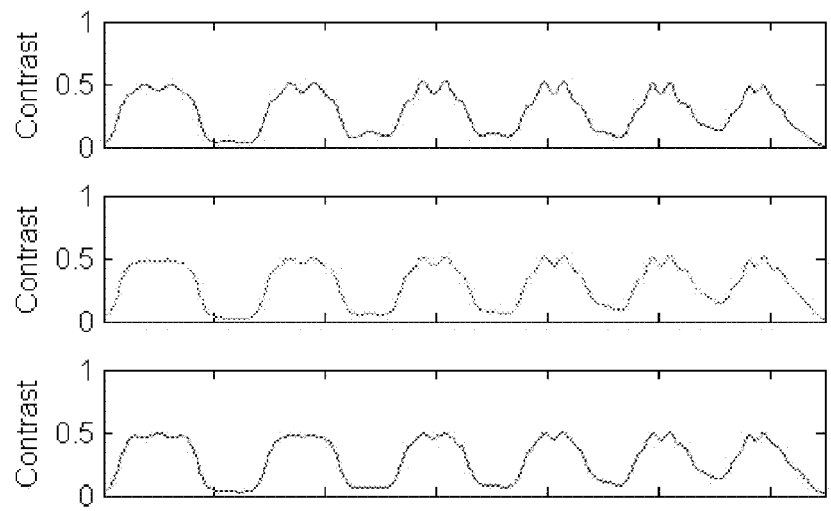
Figure 6B:
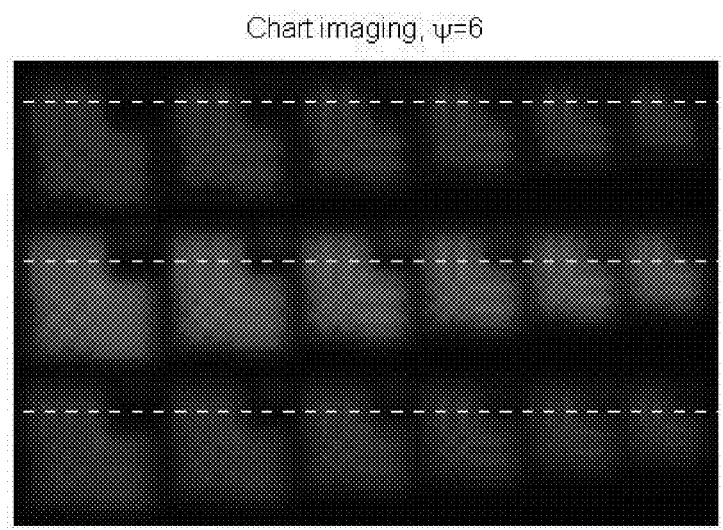
Figure 7A:
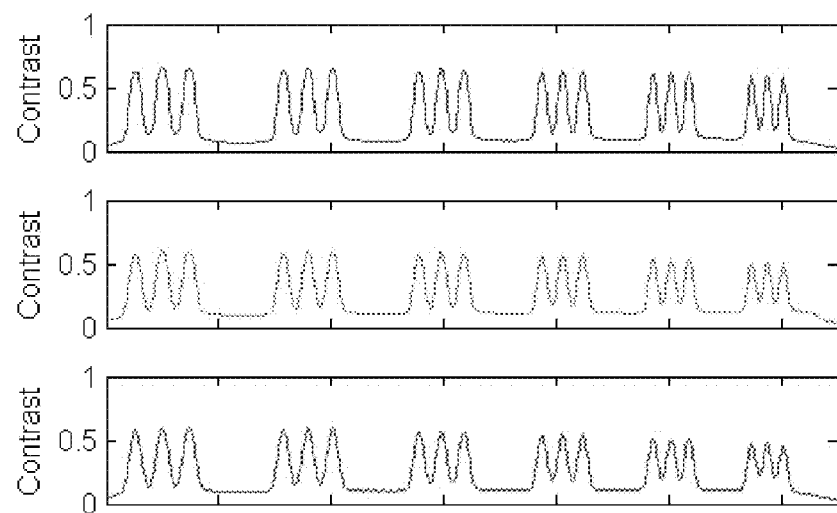
Figure 7B:
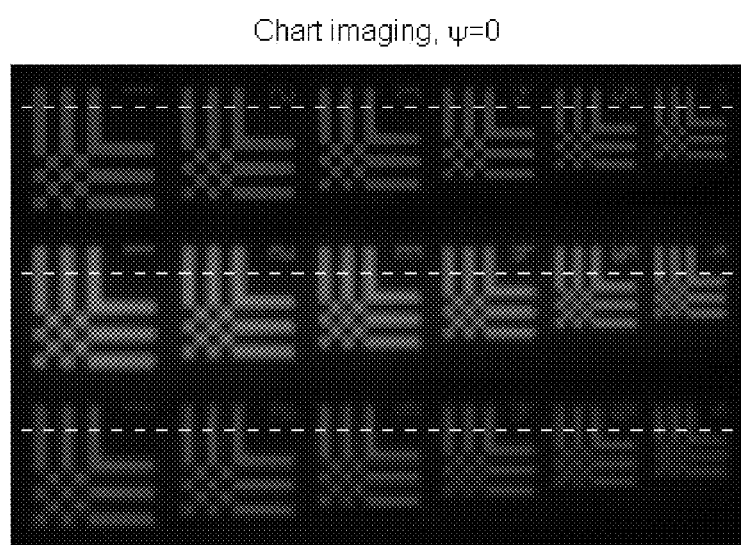
Figure 8A:
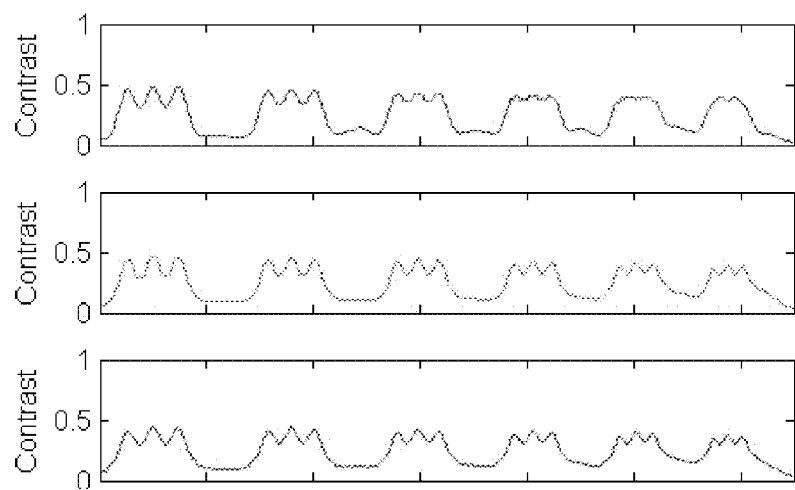
Figure 8B:
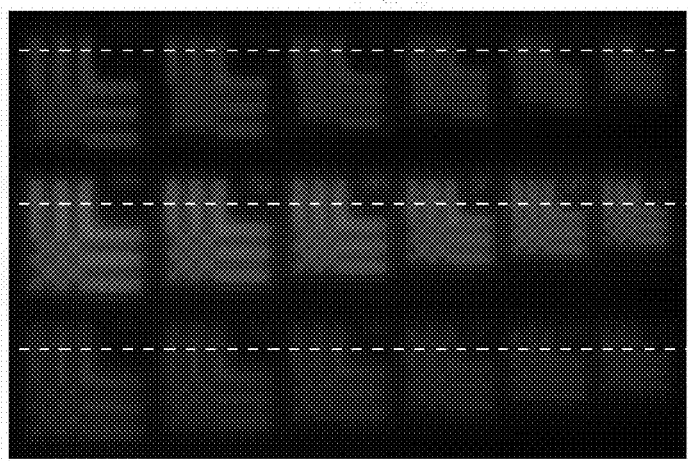

Modulation Transfer Function (MTF) curves for the visible spectrum sampled at representative RGB wavelengths ($\lambda=650$, 550, 450 nm, respectively) were derived for two cases: clear aperture (FIGS. 3A-C) and with MPM optimized for green wavelength incorporated (FIGS. 4A-C). The MTF curves have been calculated for an in-focus condition ($\psi=0$), as well as for the out-of-focus cases of $\psi_G=3$ and $\psi_G=6$ (evaluated for green, where $\psi_{R,B}$ are the corresponding values according to EQ. (1). For example for $\psi_G=6$ one gets $\psi_R=5.1$, $\psi_B=7.2$). All of the MTF curves are drawn on a normalized spatial frequency scale, where the normalization factor is $v_{max}$—the cut-off frequency of a diffraction-limited system for $\lambda=450$ nm. As shown, in the presence of the MPM, the green band has a better response at $\psi_a=6$, than the red and blue band responses.

MPM Imaging Examples—Simulation Results

The imaging performance for clear aperture system, and for the case of incorporating the MPM, has been simulated for in-focus condition, and for out-of-focus condition corresponding to $\psi_a=6$ (FIGS. 5A-8B). The imaging simulation was carried for an RGB Chess-Bar® [4] template object, where the first group's spatial frequency (measured along the indicated ID pattern section) is $v=0.17v_{max}$ and the last group's spatial frequency is $v=0.3v_{max}$. The results for the clear aperture system are presented in FIGS. 5A-6B, and the results for the case of incorporating MPM are presented in FIGS. 7A-8B. The traces (FIGS. 5A, 6A and 7A) were obtained for the intensity along the indicated dashed line on the respective color image (FIGS. 5B, 6B and 7B). As shown, the mask provides improved imaging performance for all wavelength bands, particularly the green band.

Example 2

Phase Mask Suitable for Polychromatic Illumination

The characteristics of a binary phase mask that extends the DOF of an imaging system were defined above. The design is carried for a central wavelength, while the performance at other wavelengths (or broad bandwidth illumination) is consequential. As shown above, the performance degrades for other wavelengths, in particular for the shorter wavelengths. While conceiving the present invention it has been hypothesized that a mask providing an equal phase shift (say $\pi$, thus preserving the feature of symmetry around the in-focus position) for all wavelengths under consideration can provide an improved performance. It was realized by the present inventors that an imaging system equipped with such mask would exhibit extended DOF for a broad bandwidth (BW) simultaneously.

Before discussing the fabrication of such mask, a procedure suitable for determining the mask's rings radii will be presented.

Polychromatic DOF Mask Exhibiting the Same Phase Shift for Every Wavelength

A polychromatic DOF mask that provides the same phase shift for all wavelengths under consideration, can be designed by solving the following equation:

$$\max_{r} \min_{\psi \in DOF, \lambda \in \{\lambda_i\}} [v : MTF(\lambda, v, r, \psi) = C_d] \qquad \text{EQ. (4)}$$

where $\lambda$ is the wavelength and $\lambda_i$ is a sample in the wavelength band. The other notations in EQ. (4) are the same as in EQ. (2).

The Example discusses a polychromatic DOF mask in which the phase shift that is generated by the mask is $\pi$, but other predetermined values for the phase shift are also contemplated, and one of ordinarily skilled in the art, provided with the details described herein would know to adjust the calculations for any other value of the phase shift.

In the modified optimization process of EQ. (4), the solution determines the radii that maximize the minimum cut-off frequencies for the entire DOF in all the sampled wavelengths $\lambda_i$, where the "minimum cut-off frequency" is the lowest frequency along all the DOF under consideration, where the MTF is above the acceptable minimal contrast. The sampling density in the wavelength dimension is optionally and preferably selected according to the specific application. For a test case using $\lambda_i=650$, 550, 450 nm wavelengths (and the other parameters as for the MPM test case, above), the resulting normalized ring's radii are $r_1=0.78$, $r_2=0.926$, and the minimum cut-off frequency along all the wavelengths is $0.37v_{max}$.

Throughout this application, ring radii are recited in units that are normalized to the radius of the pupil of the imaging system. Thus, for example, $r_1=0.78$ means an inner radius that is 0.78 smaller than the pupil 270 of the optical (e.g., imaging) system 272, and $r_2$=0.926 means an inner radius that is 0.926 smaller than the pupil 270 of the optical (e.g., imaging) system 272.

Plots of the MTF curves for in-focus position ($\psi$=0), as well as for $\psi_G$=3 and $\psi_G$=6 (with the slightly different values calculated for $\psi_{R,B}$ using EQ. (1) are presented in FIGS. 9A-C. In comparison with the MTF curves obtained with the MPM (see FIGS. 4A-C), the mask of the present embodiments provides improved performance results.

Figure 10A:
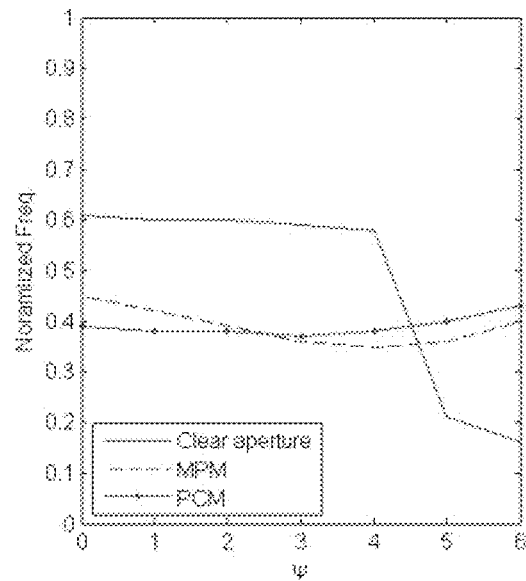
Figure 10B:
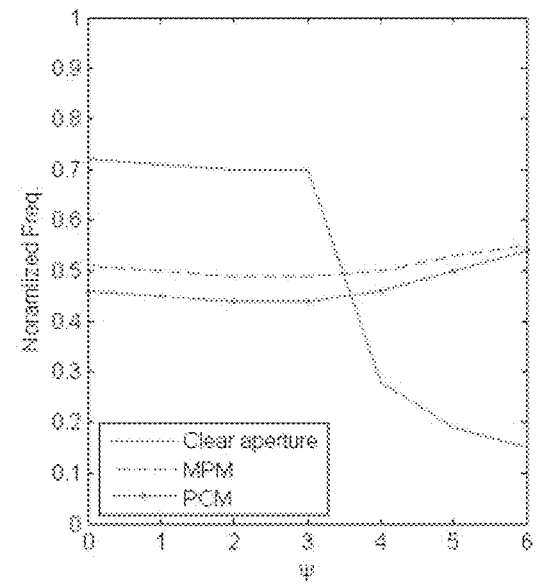
Figure 10C:
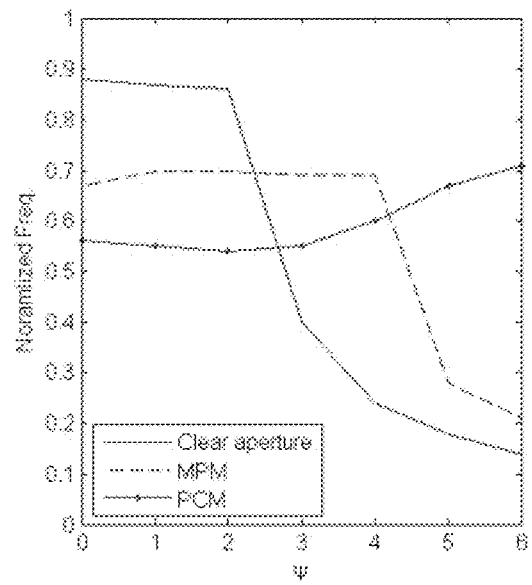
Figure 11A:
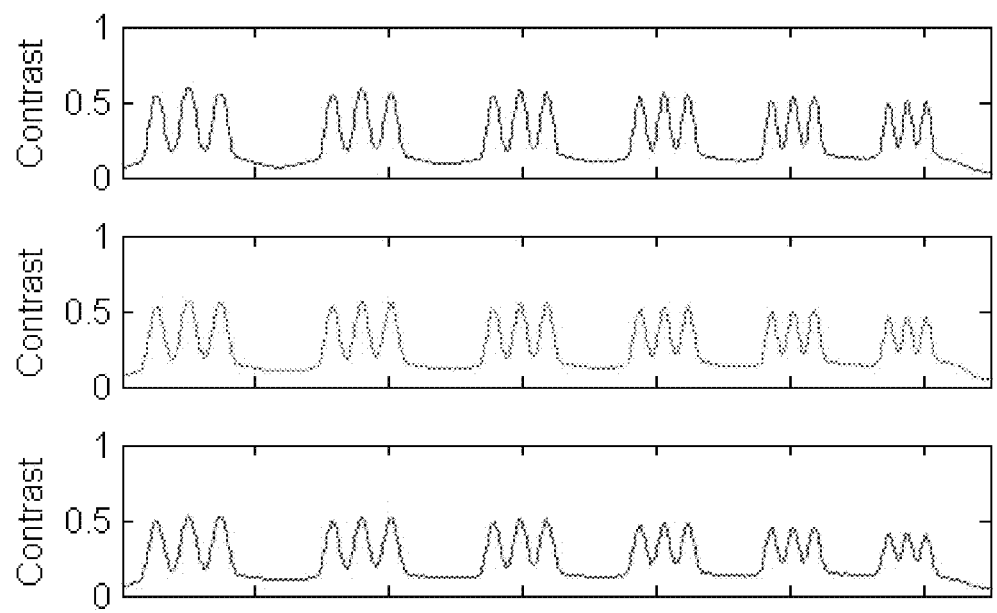
Figure 11B:
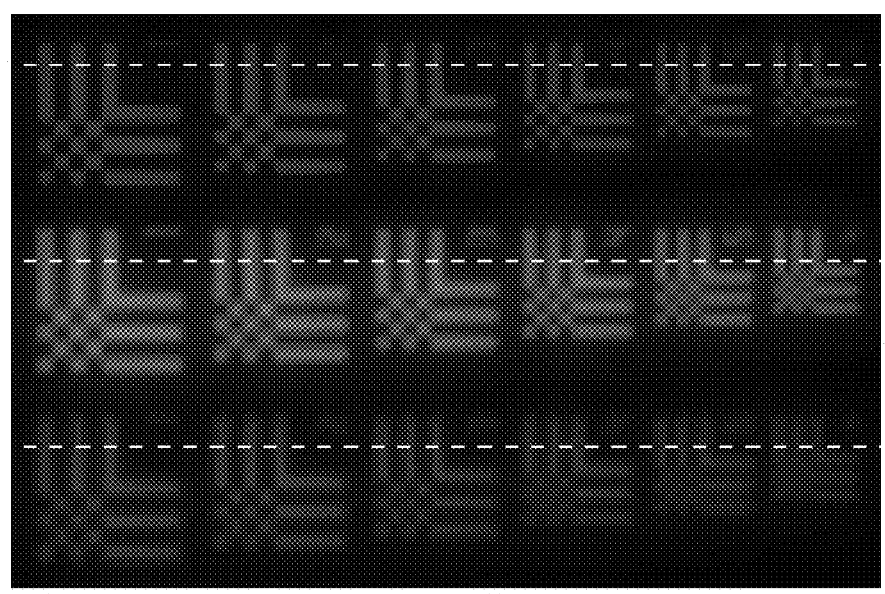

FIGS. 10A-C is a graph of the cut-off frequency (determined where the contrast reaches 5%) as a function of the $\psi$ defocus measure, for the three cases (clear aperture, MPM and the polychromatic mask) and three color bands. The improvement in the optimization goal (the overall minimum cut-off frequency), which is $0.37v_{max}$ for the polychromatic mask against $0.21v_{max}$ for the MPM and $0.14v_{max}$ for clear aperture, is vivid. An improvement in the blue band for high $\psi$ values is also observed. Also observed are improvements in the red band for high $\psi$ values, and a moderate deterioration for low $\psi$ values. The green band cut-off frequency is reduced in a small manner.

Thus, by accepting a minor deterioration to the green channel performance, in accordance with some embodiments of the present invention, DOF extension for all the color bands simultaneously is achieved. This mask is referred to herein below as Polychromatic Composite Mask (PCM).

PCM Imaging Simulation Results

The imaging performance of a system incorporating a PCM according to some embodiments of the present invention was simulated, for the same RGB Chess-Bar template object as for the MPM case above. The imaging simulations results for $\psi$=0 and $\psi_G$=6 are presented in FIGS. 11A-12B. In comparison with the simulation results presented in FIGS. 7A-8B, improvement in the blue band (in comparison with the MPM performance), and the red band are observed.

The contrasts of the first and last bar groups (in $\psi_G$=6 condition) were calculated from the provided traces (for the three wavelengths), and the results are presented in Table 1, below, (for the frequency group of $v$=$0.17v_{max}$ and Table 2 (for the frequency group of $v$=$0.3v_{max}$. Whenever there were no measurable results due to zero/reversed contrast, a hyphen was placed instead of a numerical value. As shown, the contrast obtained with the PCM of the present embodiments is higher.

TABLE 1

| | Clear aperture | MPM | Polychromatic Mask |
|---|---|---|---|
| Red | 3% | 15% | 21% |
| Green | — | 15% | 18% |
| Blue | — | 17% | 20% |

TABLE 2

| | Clear aperture | MPM | Polychromatic Mask |
|---|---|---|---|
| Red | — | 9% | 13% |
| Green | — | 7% | 12% |
| Blue | — | — | 9% |

Exemplary Design of the PCM

The PCM of the present embodiments has two phase shift elements with inverse profiles and different dispersion properties. In various exemplary embodiments of the invention the PCM has a first mask exhibiting positive phase shift and low dispersion, and a second mask exhibiting negative phase shift and high dispersion. The two masks can be placed adjacent to one another to form the PCM. The PCM can be placed in the pupil of an imaging system, and can serve as a polychromatic mask. The PCM of the present embodiments has a nearly constant phase shift.

The negative and positive phase shifts are optionally and preferably achieved by etching into the surface or by etching the surrounding area (FIG. 13).

As indicated in EQ. (3), the MPM consists of a ring with phase shift of:

$$\varphi_{MPM} = \frac{2\pi}{\lambda} h(n(\lambda) - 1) \qquad \text{EQ. (5)}$$

In the present example, two masks with the same ring radii and $n_1$, $h_1$ and $n_2$, $h_2$ respectively, positioned one beyond the other are considered. The composite phase shift delivered by the ring area can be expressed as:

$$\varphi_{PCM} = \varphi_1 + \varphi_2 = \frac{2\pi}{\lambda} h_1(n_1(\lambda) - 1) + \frac{2\pi}{\lambda} h_2(n_2(\lambda) - 1) \qquad \text{EQ. (6)}$$

$h_1$ and $h_2$ are optionally and preferably selected according to the following optimization criterion:

$$\min_{h_1, h_2} \left[ \int_{\lambda_1}^{\lambda_2} (\varphi_{PCM}(\lambda, n_1, h_1, n_2, h_2) - \varphi_{desired})^2 d\lambda \right] \qquad \text{EQ. (7)}$$

where $[\lambda_1, \lambda_2]$ is the wavelengths bandwidth and $\varphi_{desired}$ is a predetermined desired constant phase shift value. For example, $\varphi_{desired}$ can be selected to be $\pi$ radians. The resulting height/depth can be selected according to some embodiments of the present invention to minimize the MSE from the desired phase shift. For numeric evaluation, the integral in EQ. (7) can be replaced, for example, by a Riemann sum, optionally and preferably with sufficiently dense sampling of the wavelength bandwidth, thus digitizing the integration operation, and simplifying its solution.

Representative Examples for Properties of Material Pairs Suitable for the PCM

Following is a representative example of a design consideration for the purpose of reducing the variation in phase shift over the illumination BW. Applying a requirement that the two components of the phase shift masks provide phase shift of opposite signs one has $h_2$=$-\alpha \cdot h_1$, so that EQ. (6) can be rewritten as:

$$\varphi_{PCM} = \frac{2\pi}{\lambda} h_1[(n_1(\lambda) + \alpha \cdot (1 - n_2(\lambda))) - 1] \qquad \text{EQ. (8)}$$

Denoting $n^*(\lambda)$=$(n_1(\lambda)+\alpha \cdot (1-n_2(\lambda)))$, EQ. (8) can be written as:

$$\varphi_{PCM} = \frac{2\pi}{\lambda} h_1[n^*(\lambda) - 1] \qquad \text{EQ. (9)}$$

which has the same form as the MPM phase expression (EQ. (3)), except that the refractive index is replaced with a new effective refractive index n*(λ). According to some embodiments of the present invention the materials of the two masks are selected such that when their respective refractive indices $n_1$ and $n_2$ substituted in the above expression for [n*(λ)−1], the resulting expression is approximately linear with the wavelength. It was found by the present inventors that this selection cancels the reciprocal dependence of $\varphi_{PCM}$ on λ.

In various exemplary embodiments of the invention the effective refractive index n*(λ) has a sufficiently large mean value, so that the etching depth required is not excessively high.

In various exemplary embodiments of the invention the two materials exhibit sufficiently large difference in both the refractive index and dispersion properties (i.e. large Abbe number difference).

Representative Examples of a PCM for the Visible Band

Design examples for the visible band will now be presented.

In a first example, the materials pair is Fk51A crown (low dispersion) and LaSF9 flint (high dispersion) glasses. The resulting etching depths are $h_{Fk51A}$=7.2 μm, $h_{LaSF9}$=−3.77 μm, and the resulting phase shift is presented in FIGS. 14 and 15. The MSE from π-phase shift is 1.8%, and the maximal deviation is 11%.

In a second example, the LaSF9 is replaced by SF11. In this example the depth is $h_{Fk51A}$=5.17 μm, $h_{SF11}$=−2.83 μm and the corresponding MSE is 2% and the maximal deviation is 11.5%.

The same procedure can be also used for obtaining any general constant phase shift other than π over the extended wavelength bandwidth.

Sensitivity Analysis

The generally constant phase shift provided by the composite mask of the present embodiments is mainly dependent on the rings' height/depth. The ring form can be fabricated in the substrate by wet/dry etching, deposition, 3D printing, or any other method. The sensitivity of the composite mask phase shift to fabrication errors will now be analyzed. In some embodiments of the present invention, the phase shift provided by the PCM is linearly dependent on both $h_1$, $h_2$. Therefore, the resulting phase shift can be expressed as:

$$\varphi_{PCM}(h'_1, h'_2) = \varphi_{PCM}(h_1, h_2) + \frac{2\pi}{\lambda}[h_1^{err}(n_1 - 1) + h_2^{err}(n_2 - 1)] \quad \text{EQ. (10)}$$

where $h'_i$ (i=1.2) is the manufactured height/depth defined as $h'_i = h_i + h_i^{err}$, $h_i$ being the desired height and $h_i^{err}$ being the fabrication error. An additive error in the heights effects an additive error in the phase shift. It is noted that since one material is etched to from a groove, while the other material is etched to form a relief, the errors cancel each other, provided they are in the same direction for both structures. The term in EQ. (10) can be used for evaluating the expected phase shift error, according to the fabrication method known inaccuracies.

Example 3

Phase Mask Suitable for Athermalization

Infra-Red (IR) imaging is extensively used in recent years. Until the beginning of the 21$^{st}$ century, only very expensive IR imaging systems were fabricated. Over the past decade, IR imaging systems became wide spread for many applications. The present embodiments provide techniques for producing optical element for use in IR imaging system, particularly.

One of the most popular materials used in the fabrication of IR lenses is Germanium (Ge). Its main attributes are high refractive index, very low dispersion, high transparency (mainly for LWIR), widespread availability and low cost. Ge exhibits high sensitivity of its refractive index with the temperature. This sensitivity is 100 times higher than that of glass (the main material for lenses in the visible range), and a few times higher than that of any other IR optical materials. The change in refractive index due to temperature results in a temperature-dependent focal length. Many approaches have been developed to solve the thermal focal shift (TFS) problem (known as 'IR Lens Athermalization') so that the use of Ge as an IR optical material would be viable. The presently known approaches are summarized below.

Active techniques treat the defocus due to temperature variations as a simple focusing problem, using mechanical shift of the lens by motors or piezo-electric sensors, compensates for it [7]. Advanced solutions of this kind use a temperature sensor on or near the lens, along with information on the captured image in the focusing process. It was found by the present inventors that this approach requires advanced opto-mechanical design and complicated manufacturing process, thus making it reasonable only for the more expensive upper-end systems.

Passive athermalization techniques are achieved via proper choice of mechanical materials for the lens housing [8]. By correct selection of mechanical materials that expand/contract with temperature variations in the appropriate way, the thermal focal shift can be compensated and will not be sensed in the image plane. It was found by the present inventors that this kind of design has limitation since it relies on exotic mechanical materials, and also on complex opto-mechanical design.

Another passive approach for solving the thermal focal shift is by using mixture of optical materials [9]. This method uses a mixture of IR optical materials, formed as positive and negative lenses, so that the effective focal length remains constant with temperature. It was found by the present inventors that this solution has limitation since it requires many lenses (typically more than two) and also relies on availability of exotic optical materials.

Another technique is referred to as wavefront coding. In wavefront coding, a phase mask added in the optical path, resulting in an imaging optical system that exhibits a constant Point Spread Function (PSF) through the entire thermal focal shift range [10,11]. Such PSF that maintains invariance over a large DOF provides images of poor quality that require post processing for restoring utilizable images. Thus, after the acquisition of an optical image, image restoration is achieved via a digital post-processing stage based on a de-convolution algorithm. It was found by the present inventors that this solution has limitation since the de-convolution algorithm requires extensive computational power, and has an inherent noise amplification effect. Additionally, the present inventors found that this method does not adequately provide athermalization, since IR detectors have high noise level that is amplified by the de-convolution algorithm.

It was found by the present inventors that TFS can be treated as a DOF Problem. In a classical DOF case, the defocus is evaluated using the ψ defocus parameter defined in EQ. (1) above.

In classical DOF problems, the imaging system focal plane f is constant, while $z_{img}$, $z_{obj}$ vary, thus creating a defocus effect. In a typical IR scenario, the imaging system is typically focused to infinity, so that $$z_{obj} \to \infty_s \frac{1}{z_{obj}} \to 0.$$

Additionally, the focal length of an IR imaging system varies with the temperature, f=f(T). The system is designed with respect to an operating central temperature $T_{ctr}$, and therefore $z_{img}=f(T_{ctr})$. The ψ defocus measure for IR system TFS can thus be written as:

$$\psi = \frac{\pi R^2}{\lambda}\left(\frac{1}{f(T_{ctr})} - \frac{1}{f(T)}\right) \quad \text{EQ. (11)}$$

The dependence of the focal length with the temperature is provided by [11]:

$$f(T) = f(T_{ctr})\left[1 - \left(\frac{1}{n(T)-1}\frac{\partial n}{\partial T} - \alpha_L\right)\cdot(T - T_{ctr})\right] \quad \text{EQ. (12)}$$

where T is the current temperature, n(T) is the temperature dependent refractive index and $\alpha_L$ is the thermal expansion coefficient of the lens material. Assuming a high quality Ge objective lens as a test case, with f(T=200)=25 mm, $F_\#$=1.2, operating within a temperature range of [−20°, 60°] C., the thermal defocus region of interest is limited by −6≤ψ≤6. For different applications, the range of ψ will differ. In the present Example, the range of −6≤ψ≤6 is considered, but the ordinarily skilled person, provided with the details described herein would know how to adapt the analysis to other defocus ranges.

In [1], the DOF of an imaging system was extended by introducing a phase mask consisting of concentric rings that provide π-phase shift for a central wavelength (see FIG. 1) in the imaging system's pupil. As a representative example, for the test case of Ge lens presented above, the TFS case can be solved using a single ring mask with radii of $r_1$=0.82, $r_2$=0.94.

The use of such a mask improves the imaging system response in comparison to the clear aperture case for large ψ values, as demonstrated by the MTF curves presented in FIGS. 16A-C. All the curves presented are in normalized spatial frequency scale, where the normalization factor is the cut-off frequency of the diffraction limited system. Note that, by improving the performance for large ψ values, the performance achieved at the original in-focus position (ψ=0) is significantly reduced, as shown in FIGS. 16A-C. This mask is designed for a single wavelength, and is referred to herein as a Monochromatic Phase Mask (MPM).

When the MPM is designed for a single particular wavelength, the phase shift applied by the mask for other wavelengths is different. When the phase shift mask is made of an IR optical material its properties vary with the temperature changes and the exhibited phase shift is temperature dependent. The present inventors discovered a mask that provides generally constant phase shift for all wavelengths and all temperatures in the working range.

Representative Examples of a PCM for IR

A ring of height h provides a phase shift of:

$$\varphi = \frac{2\pi}{\lambda}h(n(\lambda, T) - 1) \quad \text{EQ. (12)}$$

where λ is the wavelength, T is the temperature, n(λ,T) is the refractive index, and φ is the resultant phase shift.

The IR PCM according to some embodiments of the present invention is composed of two materials. In a first material the ring is positive, in the sense that the ring forms a groove at the surface of the material. In a second material, the ring is negative, in the sense that the ring forms a relief at the surface of the material. The resulting phase shift of the IR PCM can be written as:

$$\varphi_{PCM} = \varphi_1 + \varphi_2 = \frac{2\pi}{\lambda}h_1(n_1(\lambda, T) - 1) + \frac{2\pi}{\lambda}h_2(n_2(\lambda, T) - 1) \quad \text{EQ. (13)}$$

The following optimization can be defined:

$$\min_{h_{pos}, h_{neg}}\left[\int_{T_1}^{T_2}\int_{\lambda_1}^{\lambda_2}(\varphi_{PCM}(\lambda, T, n_1, h_1, n_2, h_2) - \pi)^2 d\lambda dT\right] \quad \text{EQ. (14)}$$

where $[\lambda_1, \lambda_2]$ is the wavelengths bandwidth of interest, $[T_1, T_2]$ is the temperature working range, and π is a representative example of a desired constant phase shift. Values for constant phase shift other than π are also contemplated in some embodiments. In these embodiments, π of EQ. (14) is replaced with the desired constant phase shift.

It was found by the present inventors that this optimization can be used to design a mask that exhibiting sufficiently low deviation from the selected phase shift for the entire bandwidth and for the entire temperature working range.

The solution to the optimization procedure provides the rings' height and depth that achieve small (e.g., minimal) Mean Squared Error (MSE) from the desired phase shift (e.g., small MSE from π). In the present Example, the integral is replaced by a Riemann sum with sufficient dense sampling of the wavelengths bandwidth and temperature working range (thus digitizing the integration operation, and simplifying the procedure).

An example carried as a test case whereby the imaging bandwidth is [8 μm, 11 μm], the temperature working range is [−10°, 50°] C. and the chosen materials are Zinc Selenide and Silicone is presented in FIG. 17A. The resulting heights of the rings are $h_{Si}$=51.75 μm, $h_{ZnSe}$=−85.33 μm. The resulting π-phase shift for the example shown in FIG. 17A exhibits a MSE of 0.06% and a maximal deviation of 3.5% for the entire wavelength band and temperature range under consideration. Another example is shown in FIG. 17B. In this example, the imaging bandwidth is [8 μm, 12 μm], a temperature working range of [−20°, 60°] C., and materials which are Germanium and Zinc Sulfide (ZnS). For the example shown in FIG. 17B, the resulting heights of the rings are $h_{Ge}$=17.6 μm, $h_{ZnS}$=−39.9 μm. The resulting π-phase shift exhibits a MSE of 0.8% and a maximal deviation of 9% for the entire wavelength band and temperature range under consideration.

The ring radii have been calculated. A test case mask was designed for the Long-Wave IR (LWIR, 8-12 μm) band, for three representative wavelengths ($\lambda$=8.66, 10, 11.33 μm) and for $\psi_{10\ \mu m\text{-}max}$=6. For this mask, the calculated radii are $r_1$=0.79 and $r_2$=0.93.

Simulation of IR Imaging with PCM

The PCM of the present embodiments is designed for providing generally constant phase shift for broad bandwidth illumination and wide temperature range. MTF curves were derived for three cases: clear aperture (FIGS. 18A-C), with MPM incorporated (FIGS. 19A-C), and with IR PCM incorporated (FIGS. 20A-C). In each case the MTF curves were calculated and drawn for three test wavelengths ($\lambda$=8.66, 10, 11.33 μm) and for three temperatures corresponding to $\psi$=0, $\psi_{10\ \mu m}$=3 (the corresponding values of $\psi$ for the other two wavelengths of 8.66 μm and 11.33 μm are $\psi_{8.66\ \mu m}$=3.5 and $\psi_{11.33\ \mu m}$=2.6), and $\psi_{10\ \mu m}$=6 (the corresponding values of $\psi$ for the other two wavelengths of 8.66 μm and 11.33 μm are $\psi_{8.66\ \mu m}$=5.3 and $\psi_{11.33\ \mu m}$=6.9).

As shown, the performance provided by the IR PCM of the present embodiments is improved.

Example 4

Mask with Varying Phase Shift Suitable for Athermalization

The present inventors devised a mask for which the phase shift vary as a function of the defocus level ($\psi$ value), and for which the resulting image quality is improved over large portion, e.g., the entire DOF, in particular for the central as well as extreme positions of $\psi$=0 and $\psi=\pm\psi_{max}$. This is an improvement over other masks that improve the image quality primarily for the extreme out of focus condition (high $\psi$), but deteriorates it for the in-focus position.

For many IR optical materials, the refractive index dependence with temperature is approximately linear with positive and generally constant slope $\partial n/\partial T$. This temperature dependence results in negative $\psi$ values for high temperatures, and positive $\psi$ values for low temperatures. Therefore, the mask is optionally and preferably able to provide a phase shift from $\varphi(T_{min})=\varphi_{min}$ to $\varphi(T_{min})=\varphi_{max}$, where $\varphi_{min}$ and $\varphi_{max}$ are predetermined parameters representing, respectively, the minimal and maximal phase shifts between which the variation of the phase shift is generally linear with the temperature. In some embodiments $\varphi_{min}=-\varphi_{max}$ and in some embodiments $\varphi_{min}\neq-\varphi_{max}$, as desired.

It was found by the present inventors that such linear dependence ensures that the mask's phase shift subtracts from the defocus phase shift of the imaging system and at least partially cancels it over a wide temperature range. A composite mask that provides a phase shift that increases generally linearly with the temperature is referred to herein as a Linear-phase Composite Mask (LCM).

Graphs showing the linear dependence of phase shift and defocus parameter on the temperature are shown in FIGS. 21A and 21B, where FIG. 21A corresponds to $\varphi_{min}$=-0.55$\pi$ radians and $\varphi_{max}$=+0.55$\pi$ radians, and FIG. 21B corresponds to $\varphi_{min}$=-$\pi$ and $\varphi_{min}$=$\pi$. It is to be understood that any other value for $\varphi_{min}$ and any other value for $\varphi_{max}$, can be selected, and the optical element can be designed and constructed based on such selections, using the technique described herein.

FIGS. 22A-D show pupil phase shift as obtained according to some embodiments of the present invention for T=10° C. (FIGS. 22A and 22C) and T=40° C. (FIGS. 22B and 22D), where FIGS. 22A-B correspond to the linear dependence shown in FIG. 21A, and FIGS. 22C-D to the linear dependence shown in FIG. 21B. A temperature of 10° C. (FIGS. 22A and 22C) corresponds to a $\psi$ value of 1.62, and temperature of 40° C. (FIGS. 22B and 22D) corresponds to a $\psi$ value of −3.25. The phase shift provided the LCM mask (denoted in FIGS. 22A-D as "LCM phase") in each of the four examples shown in FIGS. 22A-D is −0.43 radians (FIG. 22A), 0.864 radians (FIG. 22B), −0.78 radians (FIG. 22C), and 1.57 radians (FIG. 22D).

In various exemplary embodiments of the invention the desired phase shift of the mask is:

$$\varphi_{desired} = \frac{2\varphi_{max}}{T_{max} - T_{min}}(T - T_{ctr}) \quad \text{EQ. (14)}$$

According to Eq. (13), the phase shift of a composite mask is:

$$\varphi_{mask} = \frac{2\pi}{\lambda}h_1(n_1(T) - 1) + \frac{2\pi}{\lambda}h_2(n_2(T) - 1) \quad \text{EQ. (15)}$$

Utilizing the relation:

$$n_i(T) = n_i(0) + \frac{\partial n_i}{\partial T}T \quad \text{EQ. (16)}$$

the mask phase shift (Eq. (15)) can be expressed as:

$$\varphi_{mask} = \frac{2\pi}{\lambda}\left[\left(h_1\frac{\partial n_1}{\partial T} + h_2\frac{\partial n_2}{\partial T}\right)T + h_1(n_1(0) - 1) + h_2(n_2(0) - 1)\right] \quad \text{EQ. (16)}$$

Substituting the desired phase shift (presented in EQ. (14)) for $\varphi_{mask}$, the design equations for the mask of the present embodiments are:

$$\begin{cases} \frac{2\pi}{\lambda}\left(h_1\frac{\partial n_1}{\partial T} + h_1\frac{\partial n_2}{\partial T}\right) = \frac{2\varphi_{max}}{T_{max} - T_{min}} \\ \frac{2\pi}{\lambda}[h_1(n_1(0) - 1) + h_2(n_2(0) - 1)] = \frac{-2\varphi_{max} \cdot T_{ctr}}{T_{max} - T_{min}} + 2\pi k \end{cases} \quad \text{EQ. (17)}$$

It was found by the present inventors that the solution of EQ. (17) provides a mask that exhibits the desired phase shift dependence with the temperature.

The radii of the rings can be calculated as described above, with the provision that the phase shift varies with $\psi$. For example, a mask designed for, e.g., $\psi_{max}$=6 can have radii which are approximately $r_1$=0.84 and $r_2$=1. The calculation is optionally and preferably based on a predetermined central wavelength.

LCM Imaging Examples—Simulation Results

MTF curves were derived for the LCM of the present embodiments and compared with those of the MPM case, and with those obtained with a clear aperture. The resulting curves are presented in FIGS. 23A-G. The recited values of $\psi$ in FIGS. 23A-G are negative to indicate that the corresponding temperatures are generally high. The LCM performance at the in-focus position (FIG. 23A) is similar to that obtained for the clear aperture. The performance of the LCM of the present embodiments at |$\psi$|=6 (FIG. 23G) is better than that of the MPM. This is due to the fact that the MPM design takes into consideration the entire range of $\psi$ variations by utilizing a mask with phase shift that does not depend on ψ, and minimizes the error. In the LCM, in contrast, the phase shift provided by the mask is different for each value of ψ. The performance of the LCM of the present embodiments at ψ=|6| is also better in comparison with the dismal performance for a clear aperture system.

The performance for the mid-temperature range is improved due to the negative slope with respect to ψ. The phase shift provided by the LCM is subtracted from the de-focus dependent phase shift (FIGS. 22A-B), so that the total pupil phase shift is close to null over the mid-range ψ values. The imaging capabilities of the LCM were simulated using a Chess-Bar® [4] resolution template input (FIGS. 24A-I) as well as for a typical IR scene (FIGS. 25A-I) for visual comparison. As shown, the LCM of the present embodiments provides images of higher quality compared to clear aperture images and compared to images obtained using MPM.

A list of materials suitable for the phase shift mask for athermalization according to some embodiments of the present invention (e.g., IR PCM, LCM) is provided in Table 3, below. For each material, the table provides the refractive index n at λ=4 μm, the refractive index n at λ=10 μm, the rate dn/dT of charge of refractive index with the temperature T, and the spectral range for which the rate of charge is applicable.

TABLE 3

| Material | Refractive index λ = 4 μm | Refractive index λ = 10 μm | dn/dT (K$^{-1}$) | Spectral Range |
|---|---|---|---|---|
| Germanium | 4.0243 | 4.0032 | .000396 | 2.0-17.0 μm |
| Gallium Arsenide | 3.3069 | 3.2778 | .000148 | 0.9-16.0 μm |
| ZnSe | 2.4331 | 2.4065 | .000060 | 0.55-20.0 μm |
| ZnS (cleartran) | 2.2523 | 2.2008 | .000054 | 0.37-14.0 μm |
| AMTIR-1 | 2.5141 | 2.4976 | .000072 | 0.7-14.0 μm |
| AMTIR-3 | 2.6200 | 2.6002 | .000091 | 1.0-14.0 μm |
| AMTIR-4 | 2.6487 | 2.6353 | −.000030 | 1.0-14.0 μm |
| GASIR1 | 2.5100 | 2.4944 | .000055 | 1.0-14.0 μm |
| GASIR2 | 2.6038 | 2.5841 | .000058 | 1.0-14.0 μm |
| Silicon | 3.4255 | N/A | .000160 | 1.2-9.0 μm |
| Sapphire | 1.6753 | N/A | .000013 | 0.17-5.5 μm |
| BaF$_2$ | 1.4580 | 1.4014 | −.000015 | 0.15-12.5 μm |
| CaF$_2$ | 1.4097 | 1.3002 | −.000011 | 0.13-10.0 μm |
| As$_2$S$_3$ | 2.4112 | 2.3816 | −.0000086 | 0.65-8.0 μm |
| MgO | 1.6679 | N/A | .000011 | 0.4-8.0 μm |

REFERENCES

[1] E. Ben-Eliezer, N. Konforti, B. Milgrom and E. Marom. "An optimal binary amplitude-phase mask for hybrid imaging systems that exhibit high resolution and extended depth of field," OPTICS EXPRESS, pp. 20540-20561, 8 Dec. 2008.

[2] E. R. Dowski and W. Cathey, "Extended depth of field through wave-front coding," Applied Optics 34, pp. 1859-1866, 10 Apr. 1995.

[3] H. Wang and F. Gan, "High focal depth with a pure phase apodizer," Applied Optics 40, pp. 5658-5662, 1 Nov. 2001.

[4] H. Haim, N. Konforti and E. Marom, "Performance of imaging systems analyzed with two-dimensional target," Applied Optics, pp. 5966-5972, 29 Aug. 2012.

[5] S. M. Ebstein, "Nearly index-matched optics for aspherical, diffractive and achromatic-phase diffractive elements," Optics Letters. Vol. 21, No. 18, pp. 1454-1456, 15 Sep. 1996.

[6] Y. Arieli, S. Ozeri, N. Eisenberg and S. Noach, "Design of a diffractive optical element for wide spectral bandwidth," Optics Letters, Vol. 23, No. 11, pp. 823-824, 1 Jun. 1998.

[7] E. Ford, "Active temperature compensation of an infrared zoom lens," Proc. SPIE 3129, pp. 138-143, 25 Sep. 1997.

[8] H. S. Yang and et. al., "Three-shell-based lens barrel for the effective athermalization of an IR optical system," Applied Optics, pp. 6206-6213, 2011 November 2011.

[9] A. P. Wood, L. Lewell, P. A. Manning and P. P. Donohue, "Passively athermalised hybrid objective for a far infrared uncooled thermal imager," Proc. SPIE 2744, pp. 500-509, 27 Jun. 1996.

[10] G. Muyo and A. R. Harvey, "Wavefront Coding for Athermalization of Infrared Imaging Systems," Electro-Optical and Infrared Systems. Technology and Applications, pp. 227-235, 6 Dec. 2004.

[11] H. Y. Sung, S. S. Yang and H. Chang, "Software Lens Compensation Applied to Athermalization of Infrared Imaging Systems," Optical review, pp. 313-317, 1 May 2009.

[12] G. Hawkind and R. Hunneman, "The temperature-dependent spectral properties of filter substrate materials in the far-infrared," Infrared Physics & Technology, pp. 69-79, 1 Jan. 2004.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An optical element, comprising:
    a first phase shift mask formed on a first optical material and constituted to generate a positive phase shift, and
    a second phase shift mask formed on a second optical material and constituted to generate a negative phase shift,
    wherein said first mask forms an etched pattern of depth h$_1$ in said first optical material, and said second mask forms a relief pattern of height h$_2$ on said second optical material, wherein said phase shift masks are arranged serially on an optical axis, and wherein a refractive index of at least one of the first and second optical materials varies with the temperature at a rate of at least $50 \times 10^{-6}$ per degree Kelvin.

2. An infrared imaging system comprising an infrared camera and the optical element of claim 1 positioned at or near a pupil of said infrared camera.

3. A method of imaging a scene, comprising:
    receiving infrared light from the scene,
    passing said infrared light through an optical element to generate a phase shift in said infrared light, and capturing an infrared image constituted by said phase shifted infrared light,
wherein said optical element comprises the optical element of claim 1.

4. The method according to claim 3, wherein at least part of a wavelength range of said infrared light is in the near infrared range.

5. The method according to claim 3, wherein at least part of a wavelength range of said infrared light is in the mid infrared range.

6. The method according to claim 3, wherein at least part of a wavelength range of said infrared light is in the far infrared range.

7. The optical element according to claim 1, wherein said phase shift masks are selected such that an infrared light beam passing through the optical element experiences mean square variations from the phase shift of no more than 5% over a wavelength range spanning over at least 0.2 micrometer.

8. The optical element according to claim 1, wherein said phase shift masks are selected such that an infrared light beam passing through the optical element experiences mean square variations from the phase shift of no more than 5% over a temperature range of from about −20° C. to about +60° C.

9. The optical element according to claim 1, wherein said phase shift masks are selected such that an infrared light beam passing through the optical element experiences mean square variations from the phase shift of no more than 5% over a temperature range of from about −10° C. to about +50° C.

10. The optical element according to claim 1, wherein said phase shift masks are selected such that an infrared light beam passing through the optical element experiences a phase shift that is increased as a function of the temperature.

11. The optical element according to claim 10, wherein said function of the temperature is a linear function or a function having a deviation from linearity of less than 10% over a temperature range selected from the group consisting of: from about −20° C. to about +60° C.; from about −15° C. to about +60° C.; from about −20° C. to about +55° C.; from about −15° C. to about +55° C.; from about −10° C. to about +55° C.; from about −15° C. to about +50° C.; and from about −10° C. to about +50° C.

12. The optical element according to claim 1, wherein one of said first and second optical materials comprises germanium.

13. The optical element according to claim 1, wherein said first material comprises germanium, and said second material comprises zinc sulfide.

14. The optical element according to claim 1, wherein said first material comprises germanium, and said second material comprises zinc selenide.

15. The optical element according to claim 1, wherein said first material comprises germanium, and said second material comprises silicon.

16. The optical element according to claim 1, wherein said first material comprises Zinc Selenide, and said second material comprises silicon.

17. The optical element according to claim 1, wherein said first optical material is characterized by a first refractive index having a first dependence $n_1(\lambda)$ on a wavelength $\lambda$ of light passing therethrough, and said second optical material is characterized by a second refractive index having a second dependence $n_2(\lambda)$ on a wavelength $\lambda$ of light passing therethrough, and wherein said optical materials, said depth $h_1$ and said height $h_2$ are selected such that the expression $n_1(\lambda)+(h_2/h_1)[n_2(\lambda)-1]$ is approximately linear with the wavelength.

18. The optical element according to claim 1, wherein a difference between a refractive index characterizing said first optical material and a refractive index characterizing said second optical material is at least 0.1.

19. The optical element according to claim 1, wherein a difference between an Abbe number characterizing said first optical material and an Abbe number characterizing said second optical material is at least 25.

20. The optical element according to claim 1, wherein at least one of said first phase shift mask and said second phase shift mask comprises at least one ring pattern.

21. The optical element according to claim 1, wherein at least one of said first phase shift mask and said second phase shift mask comprises a plurality of ring patterns.

22. The optical element according to claim 1, wherein at least one of said first phase shift mask and said second phase shift mask comprises a plurality of concentric ring patterns.

23. A method of manufacturing an optical element, comprising:
    forming on a first optical material a first phase shift mask selected to generate a positive phase shift, said first mask forming an etched pattern of depth $h_1$ in said first optical material;
    forming on a second optical material a second phase shift mask selected to generate a negative phase shift, said second mask forming a relief pattern of height $h_2$ on said second optical material; and
    positioning said phase shift masks serially on an optical axis;
    wherein a refractive index of at least one of the first and second optical materials varies with the temperature at a rate of at least $50 \times 10^{-6}$ per degree Kelvin.

24. A method of scanning a color barcode having a plurality of colors spanning over a range of wavelengths, comprising, receiving light from the barcode, passing said light through an optical element to generate a phase shift in said light, and capturing an image constituted by said phase shifted light,
    wherein said optical comprises:
    a first phase shift mask formed on a first optical material and constituted to generate a positive phase shift, and
    a second phase shift mask formed on a second optical material and constituted to generate a negative phase shift,
    said phase shift masks being arranged serially on an optical axis, such that a light beam passing through the optical element experiences mean square variations from the phase shift of no more than 5% over a wavelength range spanning over said wavelength range.

* * * * *